United States Patent
Hormis et al.

(10) Patent No.: US 11,848,898 B2
(45) Date of Patent: Dec. 19, 2023

(54) UE WITH AN INTEGRATED REPEATER FUNCTION

(71) Applicant: QUALCOMM Incorporated, San Diego, CA (US)

(72) Inventors: Raju Hormis, New York, NY (US); Junyi Li, Chester, NJ (US); Navid Abedini, Somerset, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/810,618

(22) Filed: Mar. 5, 2020

(65) Prior Publication Data

US 2020/0295914 A1    Sep. 17, 2020

Related U.S. Application Data

(60) Provisional application No. 62/817,170, filed on Mar. 12, 2019.

(51) Int. Cl.
*H04L 5/14*    (2006.01)
*H04W 72/0446*    (2023.01)
(Continued)

(52) U.S. Cl.
CPC ......... *H04L 5/1469* (2013.01); *H04B 7/0617* (2013.01); *H04L 5/0053* (2013.01);
(Continued)

(58) Field of Classification Search
CPC ... H04W 16/26; H04W 72/02; H04W 72/042; H04W 72/0453; H04W 72/0446; H04W 88/04; H04L 5/14; H04L 5/1469
(Continued)

(56) References Cited

U.S. PATENT DOCUMENTS 7,979,022 B2 *   7/2011   Cho .................. H04B 7/155
                                              455/11.1
8,032,080 B2 *  10/2011   Andersson ......... H04B 7/026
                                              455/11.1
(Continued)

FOREIGN PATENT DOCUMENTS

WO    WO-2018091203 A1    5/2018

OTHER PUBLICATIONS

International Search Report and Written Opinion—PCT/US2020/021477—ISA/EPO—dated Jun. 8, 2020.
(Continued)

*Primary Examiner* — Jason E Mattis
(74) *Attorney, Agent, or Firm* — Holland & Hart LLP/QUALCOMM Incorporated

(57) ABSTRACT

Methods, systems, and devices for wireless communications are described. The described techniques leverage user equipment (UE) functionality to repeat wireless signals received from a base station to one or more other UEs and received from one or more other UEs to the base station. The repeating UE receives, during a transmission time interval reserved for one of uplink communication or downlink communication, a signal from a first device. The UE operates in a time division duplex network. The UE routes the signal, via a radio-frequency (RF) transmission path from an RF receive chain of the UE to an RF transmit chain of the UE. The UE retransmits the signal to a second device during the transmission time interval.

32 Claims, 14 Drawing Sheets

(51) Int. Cl.
*H04B 7/06* (2006.01)
*H04W 88/04* (2009.01)
*H04W 72/0453* (2023.01)
*H04L 5/00* (2006.01)
*H04W 72/23* (2023.01)

(52) U.S. Cl.
CPC ... *H04W 72/0446* (2013.01); *H04W 72/0453* (2013.01); *H04W 72/23* (2023.01); *H04W 88/04* (2013.01)

(58) Field of Classification Search
USPC ....... 370/310, 315, 317, 318, 321–323, 325, 370/326
See application file for complete search history.

(56) References Cited

U.S. PATENT DOCUMENTS

| | | | |
|---|---|---|---|
| 8,472,868 B2* | 6/2013 | Mu | H04B 7/15521 455/7 |
| 8,634,343 B2* | 1/2014 | Hart | H04L 27/2602 370/328 |
| 8,797,955 B2* | 8/2014 | Diao | H04W 72/048 370/328 |
| 9,119,061 B2* | 8/2015 | Mohamadi | H04B 7/2606 |
| 9,312,928 B2 | 4/2016 | Ode et al. | |
| 9,584,211 B2 | 2/2017 | Kang et al. | |
| 9,853,709 B2 | 12/2017 | Ryu et al. | |
| 10,069,600 B2* | 9/2018 | Yang | H04L 5/0069 |
| 10,116,061 B2* | 10/2018 | Artemenko | H01Q 3/245 |
| 10,149,099 B2 | 12/2018 | Kim et al. | |
| 10,484,078 B2* | 11/2019 | Gharavi | H04B 7/165 |
| 10,608,678 B1 | 3/2020 | Hormis et al. | |
| 10,651,907 B2* | 5/2020 | Clifton | H04W 74/0833 |
| 2006/0040615 A1 | 2/2006 | Mohamadi | |
| 2019/0020401 A1 | 1/2019 | Gharavi et al. | |
| 2019/0394816 A1* | 12/2019 | Kim | H04W 76/10 |
| 2020/0195310 A1 | 6/2020 | Abedini et al. | |
| 2020/0196387 A1* | 6/2020 | Roy | H04W 72/1278 |
| 2020/0252107 A1* | 8/2020 | Jacobs | H04B 7/0413 |
| 2020/0280127 A1 | 9/2020 | Hormis | |
| 2020/0280355 A1 | 9/2020 | Abedini et al. | |
| 2020/0280365 A1 | 9/2020 | Abedini et al. | |
| 2020/0280887 A1 | 9/2020 | Abedini et al. | |
| 2020/0295914 A1* | 9/2020 | Hormis | H04W 72/0453 |
| 2020/0314601 A1* | 10/2020 | Hormis | H04W 16/28 |
| 2020/0322037 A1 | 10/2020 | Abedini et al. | |
| 2020/0382208 A1 | 12/2020 | Hormis et al. | |
| 2021/0036764 A1 | 2/2021 | Li et al. | |
| 2021/0037457 A1 | 2/2021 | Li et al. | |
| 2021/0037459 A1 | 2/2021 | Li et al. | |
| 2021/0037460 A1 | 2/2021 | Li et al. | |
| 2021/0037574 A1 | 2/2021 | Li et al. | |
| 2021/0044412 A1 | 2/2021 | Li et al. | |

OTHER PUBLICATIONS

Liempd V.B., et al., "RF Self-Interference Cancellation for Full-Duplex", 2014 9th International Conference on Cognitive Radio Oriented Wireless Netwoorks and Communications (Crowncom), ICST, Jun. 2, 2014 (Jun. 2, 2014), pp. 526-531, XP032616143, DOI: 10.4108/ICST.CROWNCOM.2014.255756 [retrieved on Jul. 7, 2014] p. 526—p. 531.

Liempd B.V., "RF Self-Interference Cancellation for Full Duplex", 9th International Conference on Cognitive Radio Oriented Wireless Networks, CROWNCOM, Jun. 2014, 6 Pages.

* cited by examiner

UE WITH AN INTEGRATED REPEATER FUNCTION

CROSS REFERENCE

The present Application for Patent claims the benefit of U.S. Provisional Patent Application No. 62/817,170 by HORMIS et al., entitled "UE WITH AN INTEGRATED REPEATER FUNCTION," filed Mar. 12, 2019, assigned to the assignee hereof, and expressly incorporated by reference herein.

INTRODUCTION

The following relates to wireless communications, and more specifically to repeating wireless signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipments (UEs).

Wireless communication in wireless communications systems may be limited by path-loss through the air, physical blockers, or other constraints. In some cases, wireless communications systems may implement wireless repeaters for repeating and extending signals received from base stations to UEs and from UEs to base stations.

SUMMARY

A method of wireless communications at a user equipment (UE) is described. The method may include receiving, at the UE and during a transmission time interval reserved for one of uplink communication or downlink communication, a signal from a first device. The UE may be operating in a time division duplex network. The method may also include routing the signal via a radio-frequency (RF) transmission path from an RF receive chain of the UE to an RF transmit chain of the UE. The method may further include retransmitting the signal to a second device during the transmission time interval.

An apparatus for wireless communications at a UE is described. The apparatus may include means for receiving, at the UE and during a transmission time interval reserved for one of uplink communication or downlink communication, a signal from a first device. The UE may be operating in a time division duplex network. The apparatus may further include means for routing the signal via a radio-frequency (RF) transmission path from an RF receive chain of the UE to an RF transmit chain of the UE. The apparatus may further include means for retransmitting the signal to a second device during the transmission time interval.

In some examples of the method and apparatus described herein, receiving the signal may include operations, features, or means for receiving the signal from the first device based at least in part on the RF receive chain and one or more reception antennas of the UE being active during the transmission time interval reserved for uplink communication.

In some examples of the method and apparatus described herein, retransmitting the signal may include operations, features, or means for retransmitting the signal to the second device based at least in part on the RF transmit chain and one or more transmission antennas of the UE being active during the transmission time interval reserved for downlink communication.

In some examples of the method and apparatus described herein, routing the signal via the RF transmission path may include operations, features, or means for dividing the signal from the RF receive chain via a first divider circuit of the RF transmission path, and adding the signal to the RF transmit chain via a first combiner circuit of the RF transmission path.

In some examples of the method and apparatus described herein, receiving the signal from the first device may include operations, features, or means for receiving the signal at one or more first antennas and using the RF receive chain that includes one or more low-noise amplifiers (LNAs) and one or more phase shifters corresponding to the one or more first antennas and located between the one or more first antennas and the first divider circuit of the RF transmission path.

In some examples of the method and apparatus described herein, retransmitting the signal to the second device may include operations, features, or means for retransmitting the signal at one or more second antennas and using the RF transmit chain that includes one or more phase shifters, one or more power amplifier (PA) drivers, and one or more PAs corresponding to the one or more second antennas and located between the one or more second antennas and the first combiner circuit of the RF transmission path.

Some examples of the method and apparatus described herein may further include operations, features, or means for using a duplexer to facilitate reception and retransmission of the signal via a same set of one or more antennas.

In some examples of the method and apparatus described herein described herein, using the duplexer may include operations, features, or means for using a circulator, a directional coupler, or a rat race coupler, or a combination thereof.

In some examples of the method and apparatus described herein described herein, the same set of one or more antennas functions in a first polarization to receive the signal and functions in a second polarization to retransmit the signal.

Some examples of the method and apparatus described herein may further include operations, features, or means for adjusting a beam configuration for receiving the signal during the transmission time interval, retransmitting the signal during the transmission time interval, or both.

Some examples of the method and apparatus described herein may further include operations, features, or means for receiving a beam configuration indication from a base station, where the beam configuration may be adjusted based on the beam configuration indication.

In some examples of the method and apparatus described herein described herein, receiving the beam configuration indication may include operations, features, or means for receiving the beam configuration indication via a millimeter wave (mmW) downlink channel, a control command, or a combination thereof.

In some examples of the method and apparatus described herein described herein, the beam configuration includes a beam width, a beam direction, a beam angle, or a combination thereof.

In some examples of the method and apparatus described herein described herein, adjusting the beam configuration may include operations, features, or means for selecting one or more receive beams and one or more transmit beams based on a degree of interference at the one or more receive beams caused by a transmission on the one or more transmit beams.

Some examples of the method and apparatus described herein may further include operations, features, or means for canceling interference caused by either the receiving or the transmitting using a digital baseband processing component of the UE.

Some examples of the method and apparatus described herein may further include operations, features, or means for using one or more meta-material antennas having a negative refractive index in order to either receive the signal, retransmit the signal, or both.

Some examples of the method and apparatus described herein may further include operations, features, or means for using a material having a tunable electric permittivity and permeability in order to receive the signal, route the signal, retransmit the signal, or a combination thereof.

In some examples of the method and apparatus described herein described herein, retransmitting the signal to the second device may include operations, features, or means for broadcasting the signal to one or more other UEs.

In some examples of the method and apparatus described herein described herein, retransmitting the signal to the second device may include operations, features, or means for broadcasting or unicasting the signal to one or more other UEs.

In some examples of the method and apparatus described herein described herein, retransmitting the signal to the second device may include operations, features, or means for unicasting the signal to another UE.

In some examples of the method and apparatus described herein described herein, the first device may be a base station, the second device may be one or more UEs, and the transmission time interval may be reserved for downlink communication.

In some examples of the method and apparatus described herein described herein, the first device may be one or more UEs, the second device a base station, and the transmission time interval may be reserved for uplink communication.

In some examples of the method and apparatus described herein described herein, the signal may be a millimeter wave (mmW) transmission.

Another apparatus for wireless communications at a UE is described. The apparatus may include a radio-frequency (RF) receive chain configured to receive, at the UE and during a transmission time interval reserved for one of uplink communication or downlink communication, a signal from a first device. The UE may be configured to operate in a time division duplex network. The apparatus may also include an RF transmit chain configured to transmit the signal to a second device during the transmission time interval. The apparatus may further include an RF transmission path configured to route the signal from the RF receive chain to the RF transmit chain.

Some examples of the method and apparatus described herein may further include the RF receive chain configured to remain active for reception of the signal during the transmission time interval reserved for uplink communication.

Some examples of the method and apparatus described herein may further include the RF transmit chain configured to remain active for retransmission of the signal during the transmission time interval reserved for downlink communication.

Some examples of the method and apparatus described herein may further include a first divider circuit configured to divide the signal from the RF receive chain, and a first combiner circuit configured to add the signal to the RF transmit chain.

Some examples of the method and apparatus described herein may further include one or more first antennas, and one or more low-noise amplifiers (LNAs) and one or more phase shifters corresponding to the one or more first antennas and located between the one or more first antennas and the first divider circuit of the RF transmission path.

Some examples of the method and apparatus described herein may further include one or more second antennas, and one or more phase shifters, one or more power amplifier (PA) drivers, and one or more PAs corresponding to the one or more second antennas and located between the one or more second antennas and the first combiner circuit of the RF transmission path.

Some examples of the method and apparatus described herein may further include a duplexer configured to facilitate reception and retransmission of the signal via a same set of one or more antennas.

Some examples of the method and apparatus described herein may further include the duplexer being a circulator, a directional coupler, a rat race coupler, or a combination thereof.

Some examples of the method and apparatus described herein may further include the same set of one or more antennas configured to function in a first polarization to receive the signal and configured to function in a second polarization to retransmit the signal.

Some examples of the method and apparatus described herein may further include a digital baseband processing component configured to cancel interference caused by either the receiving or the transmitting.

Some examples of the method and apparatus described herein may further include one or more meta-material antennas having a negative refractive index in order to either receive the signal, retransmit the signal, or both.

Some examples of the method and apparatus described herein may further include the RF receive chain, the RF transmit chain, the RF transmission path, or a combination thereof being formed of materials having a tunable electric permittivity and permeability.

Some examples of the method and apparatus described herein may further include the first device being a base station, the second device being one or more UEs, and the transmission time interval being reserved for downlink communication Some examples of the method and apparatus described herein may further include the first device being one or more UEs, the second device being a base station, and the transmission time interval is reserved for uplink communication.

Some examples of the method and apparatus described herein may further include digital cancellation circuit for isolating the receiving and the retransmitting.

DETAILED DESCRIPTION

Figure 1:
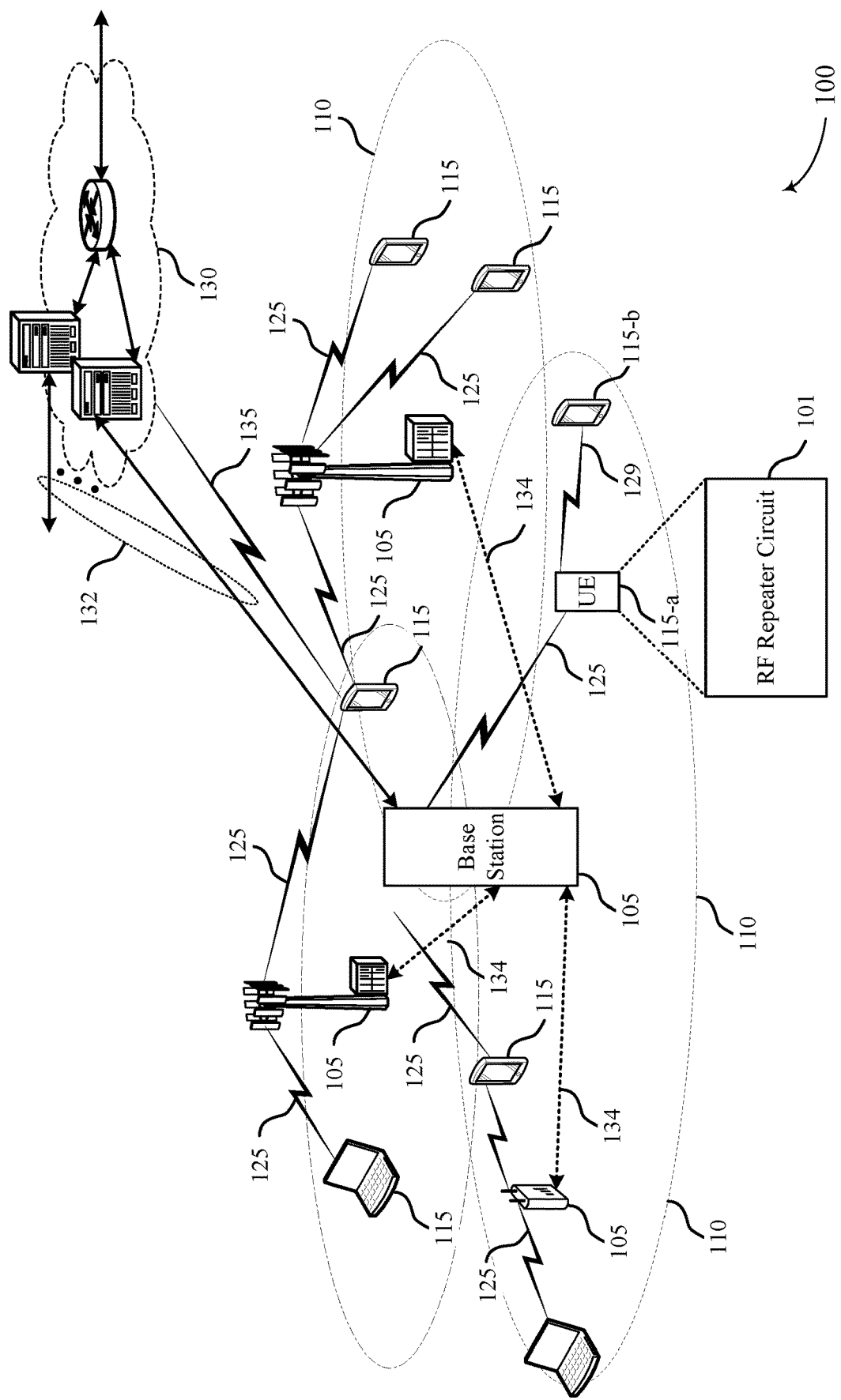
FIG. 1 illustrates an example of a system for wireless communications that supports a UE with an integrated repeater function in accordance with one or more aspects of the present disclosure.

The described techniques relate to improved methods, systems, devices, and apparatuses that support a user equipment (UE) with an integrated repeater function. The described techniques leverage UE functionality to repeat wireless signals received from a base station to one or more other UEs and received from one or more other UEs to the base station. In some radio access technologies (RATs), a UE may be limited to uplink or downlink communication during a time interval, such as a transmission time interval, which may in some instances be referred to as a transmission time interval (TTI). However, when a UE is conducting a repeater function, the UE may utilize an inactive path, due to such time interval limitations, to perform retransmission of a wireless signal. For example, during a downlink time interval, the UE is receiving a signal from a base station using reception (RX) functionality, but the transmission (TX) functionality may be dormant or in a waiting state (e.g., the TX path is inactive). Thus, wireless communications systems may leverage the inactive TX path to repeat the signal received from the base station to one or more other UEs, which may be limited by path-loss through the air, physical blockers, or other constraints. These operations may be similarly performed in uplink such that a signal limited UE may communicate with a base station via a UE utilizing uplink repeater functionality.

To perform the repeater function, a UE may be implemented with a radio-frequency (RF) transmission path to route signals received at one or more RX antennas to one or more TX antennas. The RF transmission path may use one or more divider and combiner circuits to route a signal received at a receive chain (e.g., a RX path) to the transmission chain (e.g., TX path) for retransmission. Such circuits may also be connected to a baseband processing component, which may be used to digitally process received signals and generate transmission signals. The baseband processing component may also be leveraged to maintain stability within the RF repeater circuitry such that receive and retransmission signals are isolated (e.g., interference is avoided). In some cases, the RX and TX antennas may be implemented as antenna arrays, which may perform beamforming to further increase signal isolation and quality. These beamforming antennas may be implemented as, for example and without limitation, phased array antenna arrays, dual-pole antennas or antenna arrays, meta-material antennas or antenna arrays, etc. In some aspects, a beamforming configuration (e.g., beam width, direction, and/or angle) may be signaled by a base station using a millimeter wave (mmW) downlink channel, control command, etc.

As such, in accordance with the techniques described herein, when a TTI is reserved for uplink communication, an RF receive chain (e.g., a RX path) may remain active to support the repeater functionality (e.g., such that the UE may receive signals from another UE and retransmit the signal). Similarly, when a TTI is reserved for downlink communication, an RF transmit chain (e.g., a TX path) may remain active to support the repeater functionality (e.g., such that the UE may retransmit signals received from another UE).

Particular aspects of the subject matter described herein may be implemented to realize one or more improvements. The described systems and techniques may support improvements in wireless network communication systems by implementing repeating functionality to improve reliability, among other benefits. As such, supported techniques may include improved network operations and, in some examples, may promote network efficiencies. Aspects of the disclosure are initially described in the context of a wireless communications system. Aspects of the disclosure are further described with reference to example communication circuitry for repeater functionality in a UE and a process flow diagram that illustrates a UE with integrated repeater function. Aspects of the disclosure are further illustrated by and described with reference to apparatus diagrams, system diagrams, and flowcharts that relate to UE with an integrated repeater function.

FIG. 1 illustrates an example of a wireless communications system 100 that supports a UE with an integrated repeater function in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may leverage UEs 115 to repeat signals between a base station 105 and one or more other UEs 115, which may be limited by path-loss through the air in a line of sight (LOS) scenario or limited by signal blocking or signal interfering physical objects in a non-line of sight scenario (NLOS). Using UEs 115 as a repeater may solve such problems by extending or redirecting wireless signals between the base station 105 and the limited UEs 115. For example, UE 115-a is leveraged by the wireless communications system 100 to repeat a signal received from base station 105 via communication link 125 to UE 115-b via link 129. Similarly, a signal transmitted by UE 115-b may be repeated to the base station 105 by UE 115-*a*. In aspects, the UEs 115 may communicate with other UEs 115 by unicasting, broadcasting, or multicasting.

In some RATs implemented by the wireless communications system 100, a UE 115 may be limited to uplink or downlink communication during a particular time interval, such as a TTI. For example, a UE may be operating in a time division duplex network. To perform the repeater functionality, the UE 115 may use an inactive path (e.g., TX path or RX path) during the time interval to repeat a signal between a base station 105 and one or more other UEs 115. To leverage the inactive path, a UE 115 may be implemented with an RF repeater circuit 101, which includes an RF transmission path to route signals received at one or more RX antennas to one or more TX antennas. The RF transmission path of the RF repeater circuit may use divider and combiner circuits to route a signal received at a receive chain to a transmission chain for retransmission. A baseband processing component, which may be considered a component of the RF repeater circuit 101 may be leveraged to maintain stability (e.g., automatic gain control) within the RF transmission path, the RX chain, and the TX chain. The UE 115 may also use beamforming antennas to further stabilize the repeating function by using beamforming configurations to isolate reception and transmission signals. Accordingly, the RF repeater circuit 101 may include beam controllers, phase shifters, and other beamforming components. In some cases, base station 105 may transmit a beam configuration indication (e.g., using a mmW downlink channel, control command, etc.) to base station 105 for configuring receive and/or transmit beams for repeating functionality.

A repeating UE 115 may use the same antennas or set of antennas for reception and transmission. Accordingly, the RF repeater circuit may include a duplexer (e.g., a circulator, directional coupler, or rat race coupler) to facilitate reception and retransmission of the signal via the same set of one or more antennas. The duplexer may be coupled between the antennas and the RX chain and the antennas and the TX chain. In some cases, the antennas or antenna arrays are implemented as dual-pole antennas functioning in a first polarization to receive signals and a second polarization to transmit signals. In other cases, the antennas, antenna arrays, or other components are formed using materials having a tunable electric permittivity and permeability, such as metamaterials.

Figure 2:
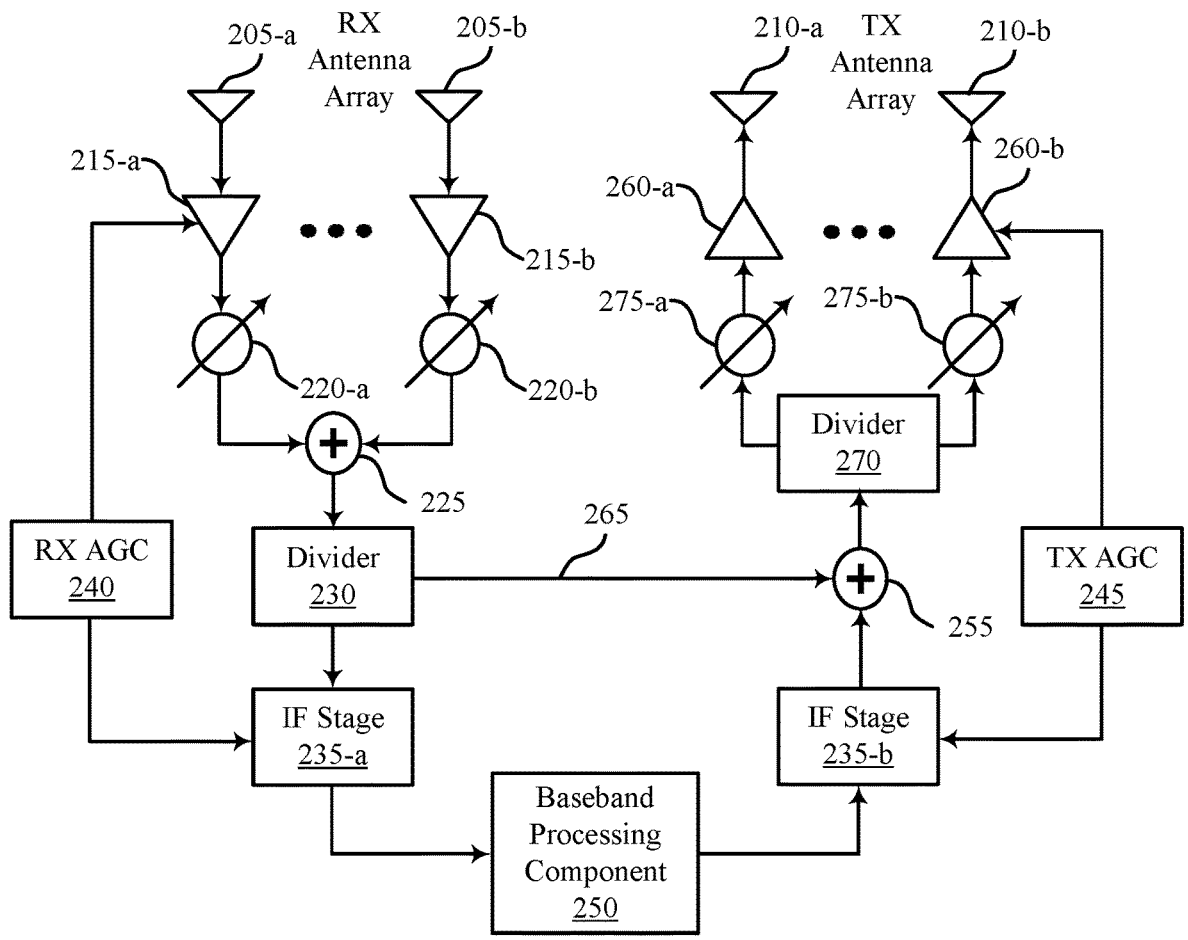
FIGS. 2 through 5 illustrate examples of a UE communications manager that supports a UE with an integrated repeater function in accordance with one or more aspects of the present disclosure.

FIG. 2 illustrates an example of a UE communications manager 200 that supports a UE with an integrated repeater function in accordance with one or more aspects of the present disclosure. In some examples, UE communications manager 200 may implement aspects of wireless communications system 100. The UE communications manager 200 may include an RF repeater circuit, which may include a divider circuit 230, RF repeater transmission path 265, and combiner circuit 255. The divider circuit 230 is coupled between an RF receive chain, an intermediate frequency (IF) stage 235-*a*, and the combiner circuit 255. The receive chain includes various components for receiving a signal, such as antennas 205, low noise amplifiers (LNAs) 215, phase shifters 220, and combiner circuit 225. The combiner circuit 255 is coupled between the divider circuit 230, an RF transmit chain, and an IF stage 235-*b*. The RF transmit chain includes various components for transmitting a signal, such as divider circuit 270, phase shifters 275, power amplifiers (PAs) 260 (which may be coupled to corresponding PA drivers), and antennas 210. The RF repeater circuit may be implemented as an RF integrated circuit (RFIC) (e.g., a monolithic microwave integrated circuit (MMIC)).

Antennas 205 may comprise an RX antenna array, which may be a phased array antenna used for beamforming to receive target RX signals. The beamforming may be controlled by a beam controller, which is used to adjust the phase using the phase shifters 220 to achieve a desired beam configuration. The received signals may be pre-processed using LNAs 215, which may be adjusted (e.g., using gain control techniques) by a RX automatic gain control (AGC) component 240 to maintain stability within the RF repeater circuitry. The received signals are routed to the combiner circuit 225, which combines the received signal into a combined signal routed to the divider circuit 230. The divider circuit 230 divides the signal into instances of the received signal, which are routed to the IF stage 235 and the combiner circuit 255 via the RF repeater transmission path 265.

The IF stage 235-*a* may convert the instance of the signal to a common frequency before the signal is demodulated at the baseband processing component 250. The baseband processing component 250 may digitally process received signals for use by other facilities of the UE. The baseband processing component 250 may further generate signals for transmission by the antennas 210 to other UEs 115 and/or a base station 105. Signals generated by the baseband processing component 250 may be routed to the IF stage 235-*b*, which may convert the signal to a common transmission frequency, and the converted signals may be routed to the combiner circuit 255.

The combiner circuit 255 adds signals received from the divider circuit 230 via the RF repeater transmission path 265 to the RF transmit chain. The signals, which may include signals generated by the baseband processing component 250 (e.g., in an uplink scenario) and signals added from the RF receive chain via the RF repeater transmission path 265 are routed to the divider circuit 270. The divider circuit 270 divides the signal into instances of the signal routed to transmit paths corresponding to the antennas 210, which may comprise a TX antenna array. The instances of the signal are routed through phase shifters 275 and PAs 260. The PAs 260 may be driven by PA drivers. Gains to the PA drivers may be adjusted by TX AGC component 245 to maintain stability within the RF repeater circuitry. TX antenna array, which may be a phased array antenna used for beamforming to transmit signals. The beamforming may be controlled by a beam controller, which is used to adjust the phase using the phase shifters 275 to achieve a desired beam configuration. In some cases, the UE communications manager 200 may not include an array of antennas as illustrated in FIG. 2. Accordingly, the UE communications manager 200 may not include the combiner circuit 225 and the divider circuit 270. Rather, the receive chain and the transmit chain may each have one path.

In an uplink or downlink time interval, such as a TTI, signals received at the RF receive chain are routed to the RF transmit chain via the divider circuit 230, RF repeater transmission line, and combiner circuit 255 for retransmission at the TX antenna array. Thus, the inactive path (e.g., transmit chain in a downlink interval or receive chain in an uplink interval) is utilized for repeating functionality. That is, the transmit chain is activated in a downlink TTI, and the receive chain is activated in an uplink TTI. Further, because signals generated by the baseband processing component (e.g., in an uplink time interval) may be orthogonal to the signals received from the other UE, the signals may not overlap or interfere with each other when combined at the combiner circuit 255. Further, the repeating function may be achieved in RF, without digital signal processing of the received or retransmitted signal. The baseband processing component 250 may be leveraged to maintain stability within the RF chain by using automatic gain control techniques. In some cases, signals received from a base station may include a beamforming configuration indication, which may signal a beam configuration for receiving and/or retransmitting the signal for repeating functionality.

Figure 3:
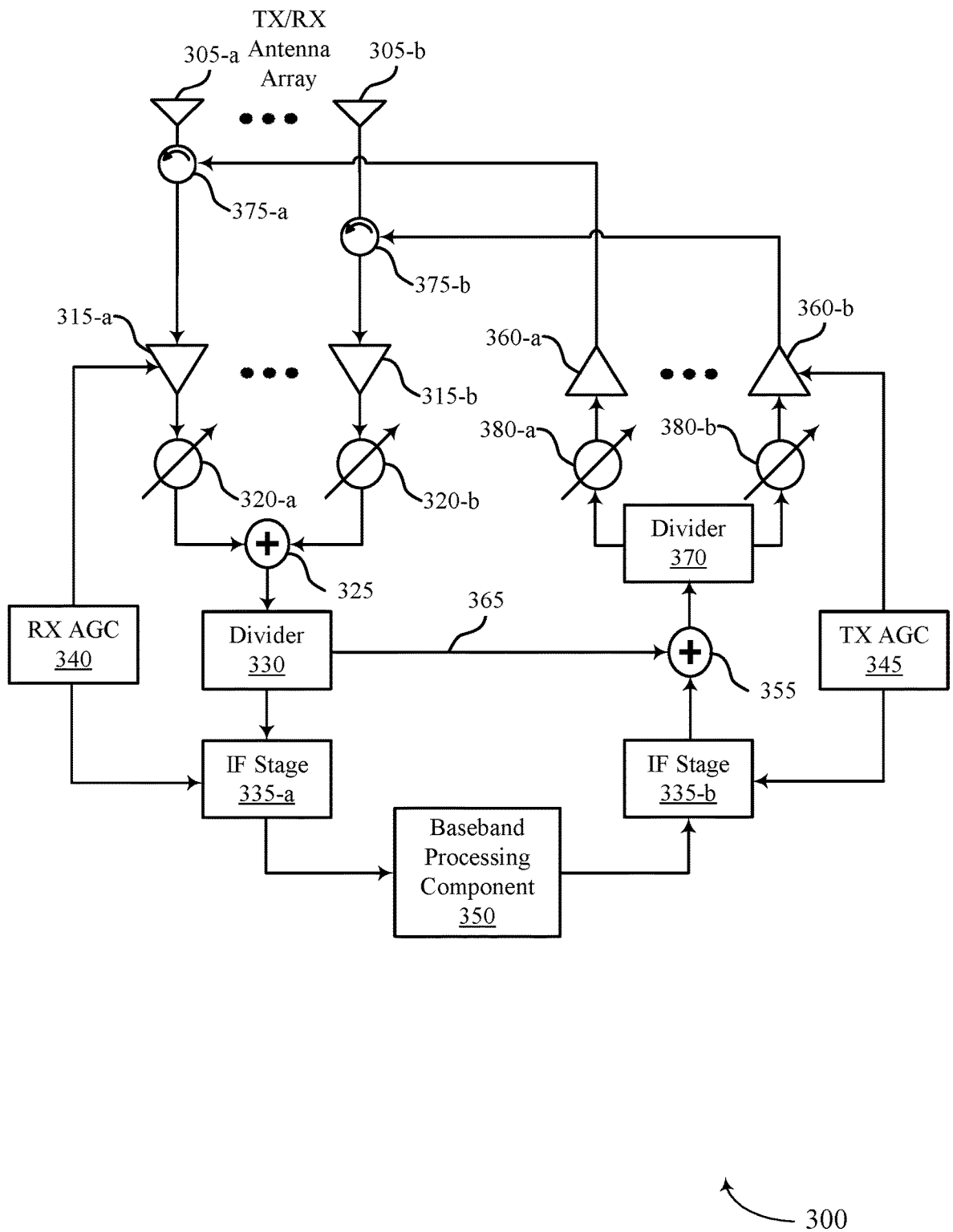

FIG. 3 illustrates an example of a UE communications manager 300 that supports a UE with an integrated repeater function in accordance with one or more aspects of the present disclosure. In some examples, UE communications manager 300 may implement aspects of wireless communications system 100. The UE communications manager 300 may include an RF repeater circuit, which may include a divider circuit 330, RF repeater transmission path 365, and combiner circuit 355. The divider circuit 330 is coupled between an RF receive chain, an IF stage 335-*a*, and the combiner circuit 355. The RF receive chain includes various components for receiving a signal, such as antennas 305, duplexers 375, LNAs 315, phase shifters 320, and combiner circuit 325. The combiner circuit 355 is coupled between the divider circuit 330, an RF transmit chain, and an IF stage 335-*b*. The RF transmit chain includes various components for transmitting a signal, such as divider circuit 370, phase shifters 380, PAs 360 (which may be coupled to corresponding PA drivers, duplexers 375, and antennas 305. The RF repeater circuit may be implemented as an RFIC (e.g., a MMIC).

Antennas 305 may be used to both receive and transmit signals. In some cases, the antennas 305 are dual-pole antennas. When the antennas 305 function in a first polarization, the antennas may function to receive signals. Similarly, when the antennas 305 function in a second polarization, the antennas 305 may function to transmit signals. Accordingly, the antennas 305 may comprise an RX and TX antenna array. Further the RX/TX antenna array may be a phased array antennas used for beamforming to receive and transmit target signals. The beamforming may be controlled by a beam controller, which is used to adjust the phase using the phase shifters 320 to achieve a desired beam configuration. The received signals may be pre-processed using LNAs 315, which may be adjusted (e.g., using gain control techniques) by a RX AGC component 340 to maintain stability within the RF repeater circuitry. The received signals are routed to the combiner circuit 325, which combines the received signal into a combined signal routed to the divider circuit 330. The divider circuit 330 divides the signal into instances of the received signal, which are routed to the IF stage 335 and the combiner circuit 355 via the RF repeater transmission path 365.

The IF stage 335-*a* may convert the instance of the signal to a common frequency before the signal is demodulated at the baseband processing component 350. The baseband processing component 350 may digitally process received signals for use by other facilities of the UE. The baseband processing component 350 may further generate signals for transmission by the antennas 305 to other UEs 115 and/or a base station 105. Signals generated by the baseband processing component 350 may be routed to the IF stage 335-*b*, which may convert the signal to a common transmission frequency, and the converted signals may be routed to the combiner circuit 355.

The combiner circuit 355 adds signals received from the divider circuit 330 via the RF repeater transmission path 365 to the RF transmit chain. The signal output by the combiner circuit 355, which may include signals generated by the baseband processing component 350 (e.g., in an uplink scenario) and signals added from the RF receive chain via the RF repeater transmission path 365 are routed to the divider circuit 370. The divider circuit 370 divides the signal into instances of the signal routed to transmit paths corresponding to the antennas 310. The instances of the signal are routed through phase shifters 380 and PAs 360. The PAs 360 may be driven by PA drivers. Gains to the PA drivers may be adjusted by TX AGC component 345 to maintain stability within the RF repeater circuitry. In some cases, the UE communications manager 300 may not include an array of antennas as illustrated in FIG. 3. Accordingly, the UE communications manager 300 may not include the combiner circuit 325 and the divider circuit 370. Rather, the receive chain and the transmit chain may each have one path.

In an uplink or downlink time interval, such as a TTI, signals received at the RF receive chain are routed to the RF transmit chain via the divider circuit 330, RF repeater transmission line, and combiner circuit 355 for retransmission at the RX/TX antenna array. Thus, the inactive path (e.g., transmit chain in a downlink interval or receive chain in an uplink interval) is utilized for repeating functionality. Further, because signals generated by the baseband processing component (e.g., in an uplink time interval) may be orthogonal to the signals received from the other UE, the signals may not overlap or interfere with each other when combined at the combiner circuit 355. The repeating function may be achieved in RF, without digital signal processing of the received or retransmitted signal. The baseband processing component 350 may be leveraged to maintain stability within the RF chain by using automatic gain control techniques. In some cases, signals received from a base station may include a beamforming configuration indication, which may signal a beam configuration for receiving and/or retransmitting the signal for repeating functionality.

Figure 4:
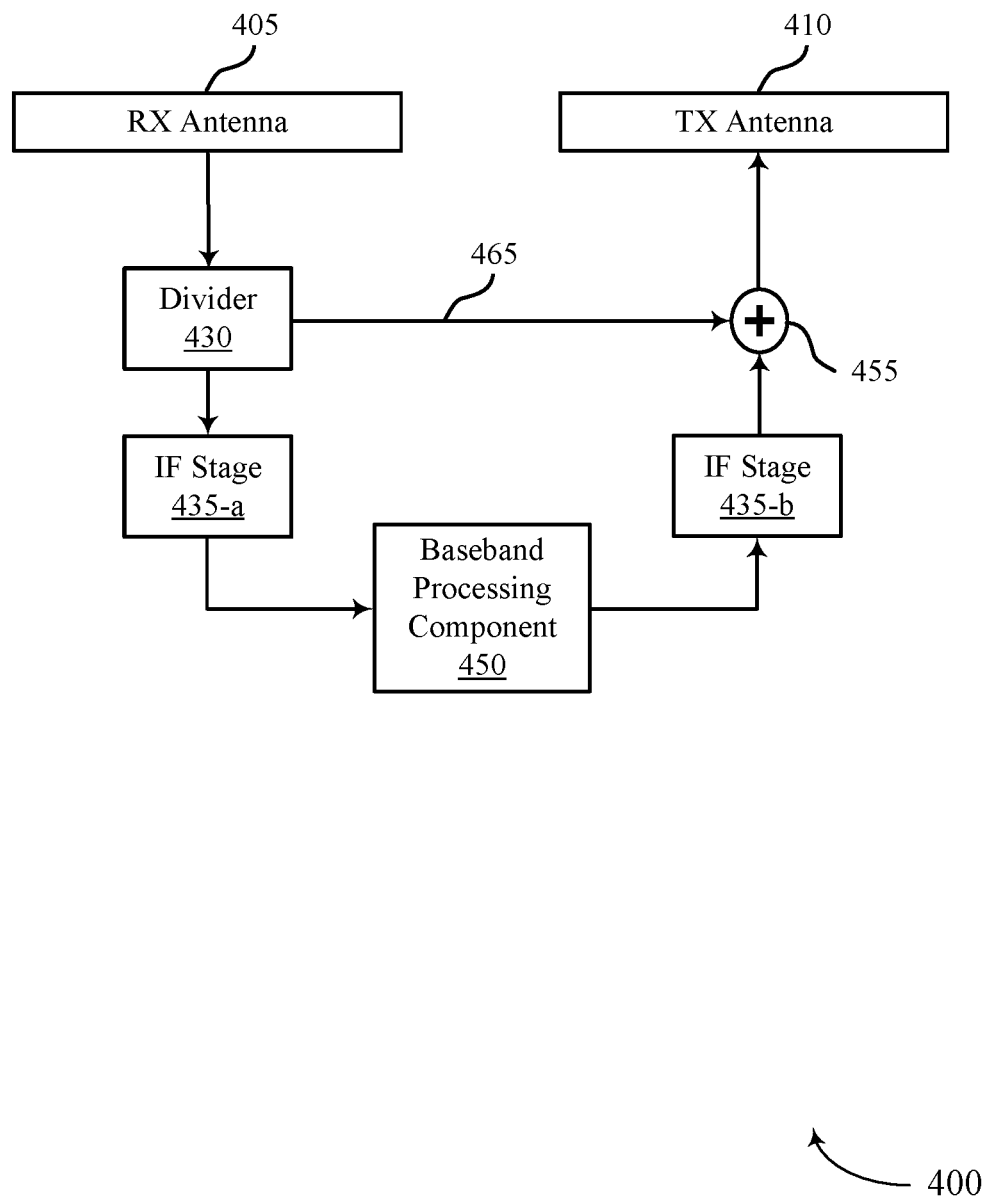

FIG. 4 illustrates an example of a UE communications manager 400 that supports a UE with an integrated repeater function in accordance with one or more aspects of the present disclosure. In some examples, UE communications manager 400 may implement aspects of wireless communications system 100. The UE communications manager 400 may include an RF repeater circuit, which may include a divider circuit 430, RF repeater transmission path 465, and combiner circuit 455. The divider circuit 430 is coupled between an RF receive chain, an IF stage 435-*a*, and the combiner circuit 455. The RF receive chain includes various components for receiving a signal, such as RX antenna 405. The combiner circuit 455 is coupled between the divider circuit 430, an RF transmit chain, and an IF stage 435-*b*. The RF transmit chain includes various components for transmitting a signal, such as TX antenna 410. The RF repeater circuit may be implemented as an RFIC (e.g., a MMIC).

The divider circuit 430 divides a signal received at the RX antenna 405 into instances of the received signal, which are routed to the IF stage 435 and the combiner circuit 455 via the RF repeater transmission path 465. The IF stage 435-*a* may convert the instance of the signal to a common frequency before the signal is demodulated at the baseband processing component 450. The baseband processing component 450 may digitally process received signals for use by other facilities of the UE. The baseband processing component 450 may further generate signals for transmission by the TX antenna 410 to other UEs 115 and/or a base station 105. Signals generated by the baseband processing component 450 may be routed to the IF stage 435-*b*, which may convert the signal to a common transmission frequency, and the converted signals may be routed to the combiner circuit 455.

The combiner circuit 455 adds signals received from the divider circuit 430 via the RF repeater transmission path 465 to the RF transmit chain. The signal output from the combiner circuit 455, which may include signals generated by the baseband processing component 450 (e.g., in an uplink scenario) and signals added from the RF receive chain via the RF repeater transmission path 465, may be routed to the TX antenna 410.

In an uplink or downlink time interval, such as a TTI, signals received at the RF receive chain are routed to the RF transmit chain via the divider circuit 430, RF repeater transmission line, and combiner circuit 455 for retransmission at the TX antenna array. Thus, the inactive path (e.g., transmit chain in a downlink interval or receive chain in an uplink interval) is utilized for repeating functionality. Further, because signals generated by the baseband processing component 450 (e.g., in an uplink time interval) may be orthogonal to the signals received from the other UE, the signals may not overlap or interfere with each other when combined at the combiner circuit 455. The repeating function may be achieved in RF, without digital signal processing of the received or retransmitted signal. The baseband processing component 450 may be leveraged to maintain stability within the RF chain by using automatic gain control techniques.

As described with respect to FIG. 3, the RX antennas 405 and the TX antennas 410 may be implemented as the same antenna such that the same antenna operates to transmit and receive. Accordingly, the UE communications manager 400 may include a duplexer (e.g., a circulator, directional coupler, rat race coupler) for facilitating transmission and reception.

Figure 5:
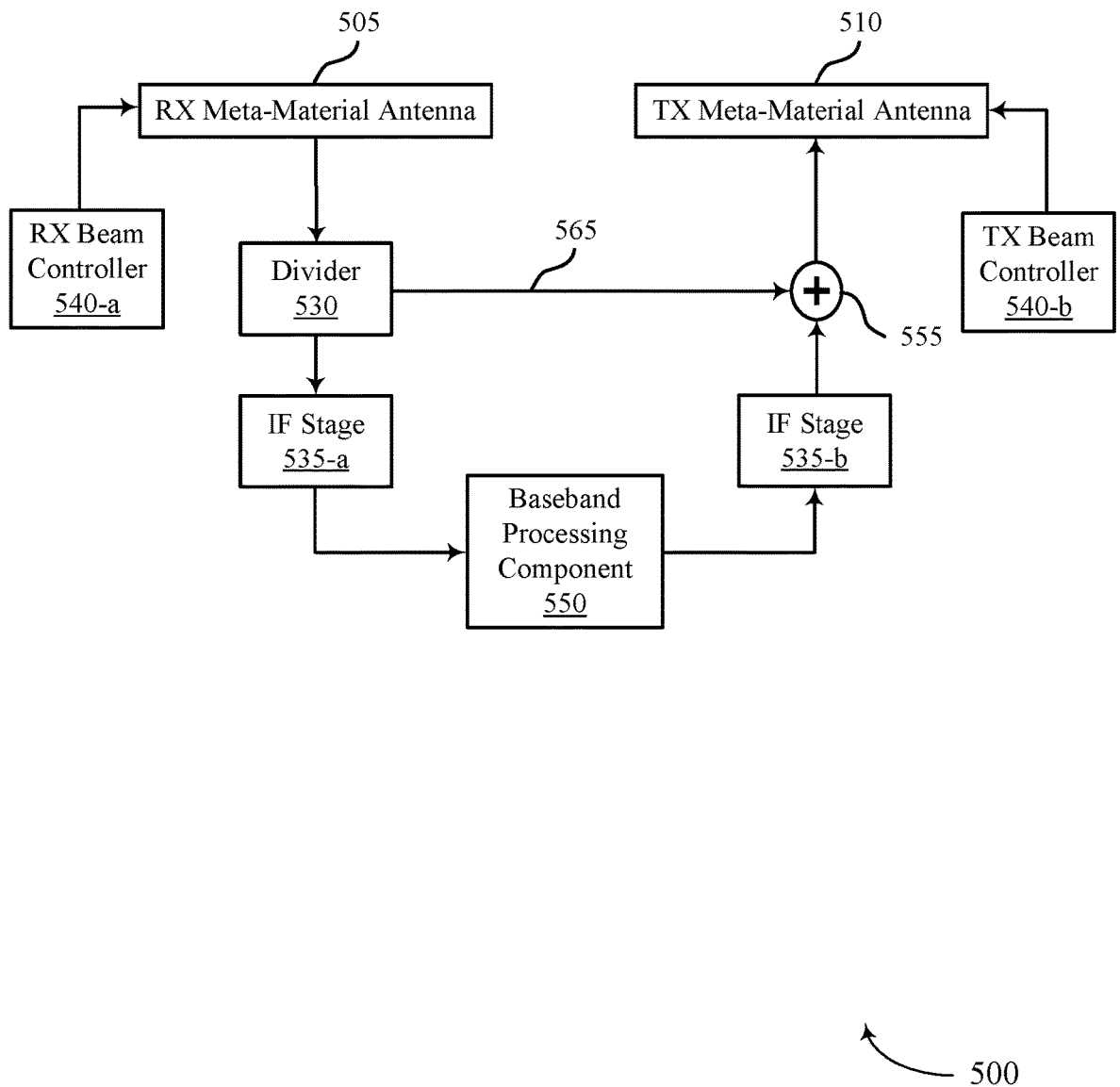

FIG. 5 illustrates an example of a UE communications manager 500 that supports a UE with an integrated repeater function in accordance with one or more aspects of the present disclosure. In some examples, UE communications manager 500 may implement aspects of wireless communications system 100. The UE communications manager 500 may include an RF repeater circuit, which may include a divider circuit 530, RF repeater transmission path 565, and combiner circuit 555. The divider circuit 530 is coupled between an RF receive chain, an IF stage 535-a, and the combiner circuit 555. The RF receive chain includes various components for receiving a signal, such as RX meta-material antennas 505. The combiner circuit 555 is coupled between the divider circuit 530, an RF transmit chain, and an IF stage 535-b. The RF transmit chain includes various components for transmitting a signal, such as RX meta-material antennas 505. The RF repeater circuit may be implemented as an RFIC (e.g., a MMIC).

RX meta-material antennas 505 may comprise an RX antenna array, which may comprise a set of meta-material antennas used for beamforming to receive target RX signals. The beamforming may be controlled by a beam controller 540-a, which is used to adjust the beam configuration of the set of RX meta-material antennas 505 for receiving signals. If the meta-material antenna is a meta-material antenna array, then the received signals may be routed to the combiner circuit, which combines the received signals into a combined signal routed to the divider circuit 530. The divider circuit 530 divides the signal into instances of the received signal, which are routed to the IF stage 535 and the combiner circuit 555 via the RF repeater transmission path 565. In some cases, the UE communications manager 500 may include a dispersion compensation component. The dispersion compensation component may correct the distortion introduced by the meta-material antenna using an RF or analog circuit.

The IF stage 535-a may convert the instance of the signal to a common frequency before the signal is demodulated at the baseband processing component 550. The baseband processing component 550 may digitally process received signals for use by other facilities of the UE. The baseband processing component 550 may further generate signals for transmission by the TX meta-material antennas 510 to other UEs 115 and/or a base station 105. Signals generated by the baseband processing component 550 may be routed to the IF stage 535-b, which may convert the signal to a common transmission frequency, and the converted signals may be routed to the combiner circuit 555.

The combiner circuit 555 adds signals received from the divider circuit 530 via the RF repeater transmission path 265 to the RF transmit chain. The signal output from the combiner circuit 555, which may include signals generated by the baseband processing component 550 (e.g., in an uplink scenario) and signals added from the RF receive chain via the RF repeater transmission path 565, may be routed to a divider circuit, which may divide the signal into instances of the signal routed to transmit paths corresponding to a set of TX meta-material antennas 510 (e.g., in a meta-metrical antenna array configuration), which may comprise a TX antenna array. The set of TX meta-material antennas 510 may be used for beamforming to transmit signals. The beamforming may be controlled by a beam controller 540-b, which is used to adjust the beam configuration for transmitting at the TX meta-material antennas 510.

In an uplink or downlink time interval, such as a TTI, signals received at the RF receive chain are routed to the RF transmit chain via the divider circuit 530, RF repeater transmission line, and combiner circuit 555 for retransmission at the TX antenna array. Thus, the inactive path (e.g., transmit chain in a downlink interval or receive chain in an uplink interval) is utilized for repeating functionality. Further, because signals generated by the baseband processing component 550 (e.g., in an uplink time interval) may be orthogonal to the signals received from the other UE, the signals may not overlap or interfere with each other when combined at the combiner circuit 555. The repeating function may be achieved in RF, without digital signal processing of the received or retransmitted signal. The baseband processing component 550 may be leveraged to maintain stability within the RF chain by using automatic gain control techniques. In some cases, signals received from a base station may include a beamforming configuration indication, which may signal a beam configuration for receiving and/or retransmitting the signal for repeating functionality.

As described with respect to FIG. 3, the met-material antennas may be implemented as the same antenna or set of antennas such that the same set of antennas operate to transmit and receive. Accordingly, the UE communications manager 500 may include a duplexer (e.g., a circulator, directional coupler, rat race coupler) for facilitating transmission and reception. In some examples, the various components described with respect to FIGS. 1 through 5 may be made of meta-materials or other materials with a tunable electric permittivity and permeability. That is, various antenna arrays, switches couplers, combiners/splitters, filters, phase-shifters, duplexers, oscillators, and various connecting elements may be formed of meta-materials or other materials with tunable electric permittivity and permeability. Accordingly, each component of an RF receive chain, and RF transmit chain, and/or an RF transmission path may be formed of meta-materials or materials with a tunable electric permittivity and permeability. For example, in FIG. 5, the divider circuit 530 and the combiner circuit 555 may be formed of such materials, in addition to the RX meta-material antennas 505 and TX meta-material antennas 510.

Figure 6:
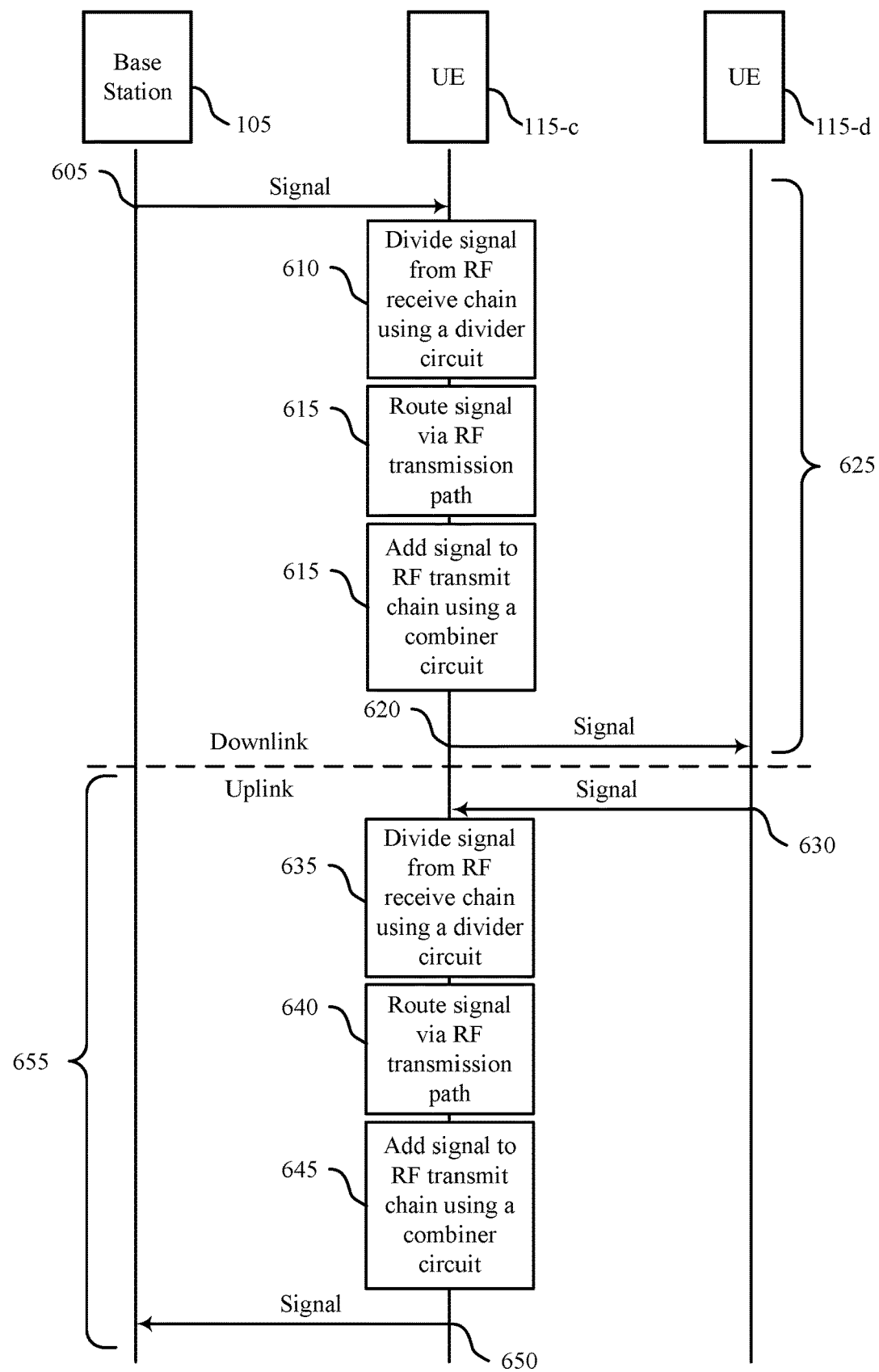
FIG. 6 illustrates an example of a process flow diagram that illustrates a UE with an integrated repeater function in accordance with one or more aspects of the present disclosure.

FIG. 6 illustrates an example of a process flow diagram 600 that illustrates a UE with an integrated repeater function in accordance with one or more aspects of the present disclosure. In some examples, process flow diagram 600 may implement aspects of wireless communications system 100. The process flow diagram 600 includes a base station 105, a UE 115-c, and a UE 115-d. In some cases, the base station 105 is a first device, and the UE 115-d is a second device. In other cases, the UE 115-d is a first device, and the base station 105 is a second device. The UEs 115 may include a UE communications manager as described herein.

At 605, the base station 105 transmits a signal to the UE 115-c. The signal may be a unicast, multicast, or broadcast signal. The signal may be received during a transmission time interval 625 reserved for downlink communication by the UE 115-c at one or more first antennas corresponding to an RF receive chain. The RF receive chain may include one or more LNAs and one or more phase shifters corresponding to the one or more antennas and located between the one or more first antennas and a first divider circuit. In some cases, the one or more first antennas comprise meta-material antennas. In some examples, the various components of the RF receive chain may be formed of materials having a tunable electric permittivity and permeability, such as meta-materials.

At 610, the UE 115-d divides the signal from the RF receive chain via first divider circuit of the RF transmission path. At 615, the UE 115-c routes the signal (e.g., an instance of the divided signal) from the RF receive chain of the UE to an RF transmit chain of the UE via the RF transmission path (e.g., an RF repeater transmission path). At 615, the UE 115-c adds the signal to the RF transmit chain via a first combiner circuit of the RF transmission path. Thus, the RF transmit chain may remain active (or be activated) during the TTI reserved for downlink communication. In some cases, the divider circuits of the UE may be Wilkinson dividers, and or the combiner circuits of the UE may be Wilkinson combiners. However, other types of combiner and divider circuits are contemplated. In some examples, the various components of the RF transmission path may be formed of materials having a tunable electric permittivity and permeability, such as meta-materials.

At 620, the UE 115-c retransmits the signal to the UE 115-d during the transmission time interval 625. The retransmitted signal may be unicast, multicast, or broadcast to the UE 115-d. In some cases, the signal is retransmitted at one or more second antennas. The RF transmit chain may include one or more phase shifters, one or more PA drivers, and one or more PAs corresponding to the one or more second antennas and located between the one or more second antennas and the first combiner circuit of the RF transmission path. In some cases, the one or more second antennas comprise meta-material antennas. In some cases, the one or more first antennas and the one or more second antennas comprise the same set of one or more antennas, and the RF communication circuit may include a duplexer to facilitate reception and retransmission of the signal via the same set of one or more antennas. In some cases, the same set of one or more antennas functions in a first polarization to receive the signal and a second polarization to retransmit the signal. In some examples, the various components of the RF transmit chain may be formed of materials having a tunable electric permittivity and permeability, such as meta-materials.

At 630, the UE 115-d transmits a signal to the UE 115-c. The signal may be received by the UE 115-c during a transmission time interval 655 reserved for uplink communication and at one or more first antennas corresponding to the RF receive chain which may remain active (or be activated) during the TTI reserved for uplink communication.

At 635, the UE 115-d divides the signal from the RF receive chain via the first divider circuit of the RF transmission path. At 640, the UE 115-c routes the signal (e.g., an instance of the divided signal) from the RF receive chain of the UE to an RF transmit chain of the UE via the RF transmission path (e.g., an RF repeater transmission path). At 645, the UE 115-c adds the signal to the RF transmit chain via a first combiner circuit of the RF transmission path.

At 650, the UE 115-c retransmits the signal to the UE 115-d during the transmission time interval 630. In some cases, the signal is retransmitted at one or more second antennas.

In some cases, the RX and TX antennas of the UE 115-d may be implemented as antenna arrays, which may perform beamforming to further increase signal isolation and quality. These beamforming antennas may be implemented as, for example and without limitation, phased array antenna arrays, dual-pole antenna antennas or antenna arrays, meta-material antennas or antenna arrays, etc. In some aspects, a beamforming configuration (e.g., beam width, direction, and/or angle) may be signaled by the base station 105 using a millimeter wave (mmW) downlink channel, control command, etc.

Figure 7:
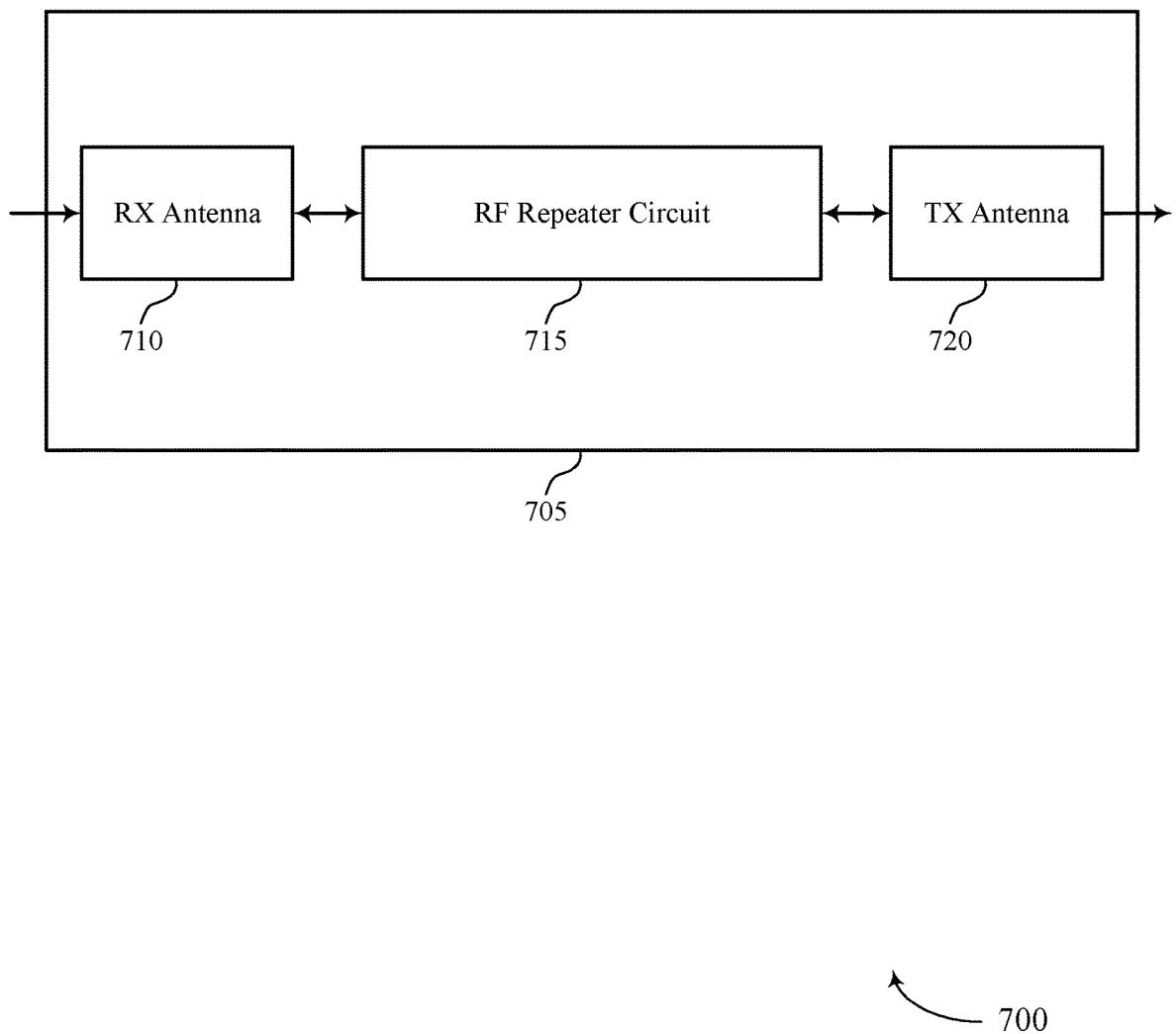
FIGS. 7 and 8 show block diagrams of devices that support UE with an integrated repeater function in accordance with one or more aspects of the present disclosure.

FIG. 7 shows a block diagram 700 of a device 705 that supports a UE with an integrated repeater function in accordance with one or more aspects of the present disclosure. The device 705 may be an example of aspects of a UE 115 as described herein. The device 705 may include a RX antenna 710, an RF repeater circuit 715, and a TX antenna 720. The device 705 may also include a processor. Each of these components may be in communication with one another.

The RX antenna 710 may receive RF signals. Signals may be passed on to other components of the device 705. The RX antenna 710 may utilize a single antenna or a set of antennas.

The RF repeater circuit 715 may receive (e.g., via the RX antenna 710), at the UE and during a transmission time interval reserved for one of uplink communication or downlink communication, a signal from a first device, where the UE is operating in a time division duplex network, route the signal via an RF transmission path (from an RF receive chain of the UE to an RF transmit chain of the UE), and retransmit (e.g., via the TX antenna 720) the signal to a second device during the transmission time interval. The RF repeater circuit 715 may be an example of aspects of the RF repeater circuit 1050 described herein. The RF repeater circuit 715, or its sub-components, may be implemented in hardware, such as an RFIC (e.g., a MMIC).

The RF repeater circuit 715, or its sub-components, may be physically located at various positions, including being distributed such that portions of functions are implemented at different physical locations by one or more physical components. In some examples, the RF repeater circuit 715, or its sub-components, may be a separate and distinct component in accordance with various aspects of the present disclosure. In some examples, the RF repeater circuit 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The TX antenna 720 may transmit signals generated by other components of the device 705. In some examples, the TX antenna 720 may be collocated with a RX antenna 710 in a transceiver module. For example, the TX antenna 720 may be an example of aspects of the transceiver 1020 described with reference to FIG. 10. The TX antenna 720 may utilize a single antenna or a set of antennas.

Figure 8:
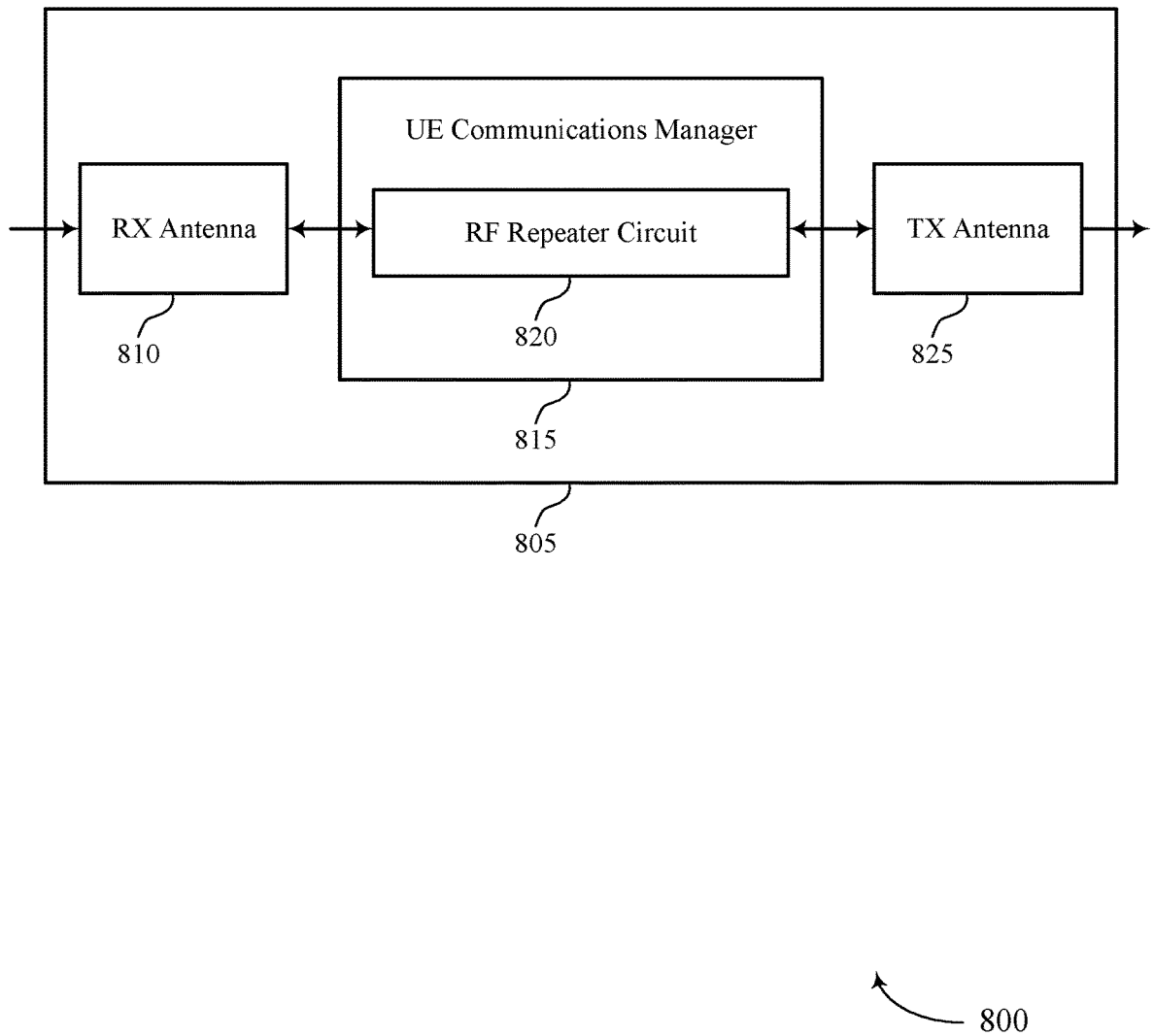

FIG. 8 shows a block diagram 800 of a device 805 that supports a UE with an integrated repeater function in accordance with one or more aspects of the present disclosure. The device 805 may be an example of aspects of a device 705, or a UE 115 as described herein. The device 805 may include a RX antenna 810, a UE communications manager 815, and a TX antenna 825. The device 805 may also include a processor. Each of these components may be in communication with one another (e.g., via one or more buses or via RF communication components).

The RX antenna 810 may receive signals. Signals may be passed on to other components of the device 805. The RX antenna 810 may be an example of aspects of the transceiver 1020 described with reference to FIG. 10. The RX antenna 810 may utilize a single antenna or a set of antennas.

The UE communications manager 815 may include example of aspects of the RF repeater circuit 715 as described herein, such as an RF repeater circuit 820. The UE communications manager 815 may be an example of aspects of the UE communications manager 1010 described herein.

The RF repeater circuit 820 may receive (e.g., via the RX antenna 810), at the UE and during a transmission time interval reserved for one of uplink communication or downlink communication, a signal from a first device, where the UE is operating in a time division duplex network, route the signal via an RF transmission path from an RF receive chain of the UE to an RF transmit chain of the UE, and retransmit (e.g., via the TX antenna 825) the signal to a second device during the transmission time interval.

The TX antenna 825 may transmit signals generated by other components of the device 805. In some examples, the TX antenna 825 may be collocated with a RX antenna 810 in a transceiver module. For example, the TX antenna 825 may be an example of aspects of the transceiver 1020 described with reference to FIG. 10. The TX antenna 825 may utilize a single antenna or a set of antennas.

The UE communications manager 815 as described herein may be implemented to realize one or more potential improvements. One implementation may allow the device 805 to more support communication reliability by performing repeater functions between a base station and one or more other UEs. For example, the device 805 may repeat beamformed signals to and from a UE using a transmission path to increase communication reliability in a wireless communications system.

Figure 9:
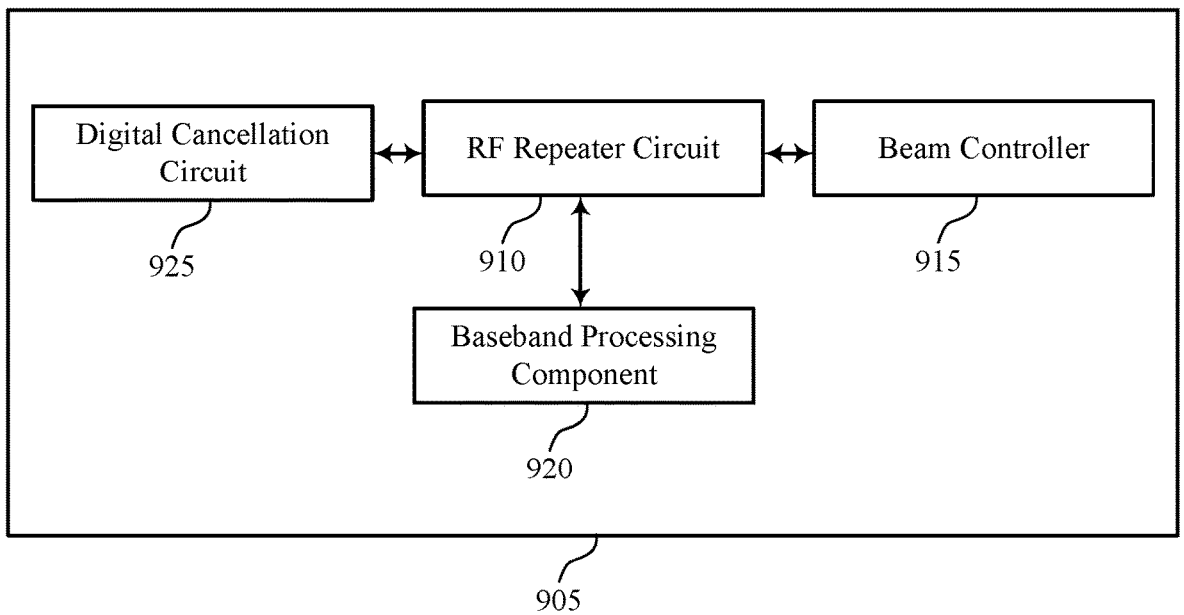
FIG. 9 shows a block diagram of a communications manager that supports a UE with an integrated repeater function in accordance with one or more aspects of the present disclosure.

FIG. 9 shows a block diagram 900 of a UE communications manager 905 that supports a UE with an integrated repeater function in accordance with one or more aspects of the present disclosure. The UE communications manager 905 may include examples of aspects of an RF repeater circuit 715 and may be example of aspects of a UE communications manager 815, or a UE communications manager 1010 described herein. The UE communications manager 905 may include an RF repeater circuit 910, a beam controller 915, a baseband processing component 920, and a digital cancellation circuit 925. Each of these modules may communicate, directly or indirectly, with one another (e.g., via RF communication circuitry).

The RF repeater circuit 910 may receive, at the UE and during a transmission time interval reserved for one of uplink communication or downlink communication, a signal from a first device, where the UE is operating in a time division duplex network. In some examples, the RF repeater circuit 910 may route the signal via an RF transmission path from an RF receive chain of the UE to an RF transmit chain of the UE. In some examples, the RF repeater circuit 910 may retransmit the signal to a second device during the transmission time interval. In some examples, the RF repeater circuit 910 may divide the signal from the RF receive chain via a first divider circuit of the RF transmission path. In some examples, the RF repeater circuit 910 may add the signal to the RF transmit chain via a first combiner circuit of the RF transmission path.

In some examples, the RF repeater circuit 910 receives the signal from the first device based at least in part on the RF receive chain and one or more reception antennas of the UE being active during the transmission time interval reserved for uplink communication. In some examples, the RF repeater circuit 910 retransmits the signal to the second device based at least in part on the RF transmit chain and one or more transmission antennas of the UE being active during the transmission time interval reserved for downlink communication.

In some examples, the RF repeater circuit 910 may receive the signal at one or more first antennas and using the RF receive chain that includes one or more LNAs and one or more phase shifters corresponding to the one or more first antennas and located between the one or more first antennas and the first divider circuit of the RF transmission path. In some examples, the RF repeater circuit 910 may retransmit the signal at one or more second antennas and using the RF transmit chain that includes one or more phase shifters, one or more PA drivers, and one or more PAs corresponding to the one or more second antennas and located between the one or more second antennas and the first combiner circuit of the RF transmission path.

In some examples, the RF repeater circuit 910 may use a duplexer to facilitate reception and retransmission of the signal via a same set of one or more antennas. In some examples, the RF repeater circuit 910 may use a circulator, a directional coupler, or a rat race coupler. In some examples, the RF repeater circuit 910 may use a one or more meta-material antennas having a negative refractive index in order to either receive the first signal, retransmit the first signal, or both. In some examples, the RF repeater circuit 910 may broadcast or unicast the signal to one or more other UEs. In some cases, the same set of one or more antennas functions in a first polarization to receive the signal and functions in a second polarization to retransmit the signal. In some examples, the RF repeater circuit 910 may unicast the signal to another UE. In some examples, the RF repeater circuit 910 may use a material having a tunable electric permittivity and permeability in order to receive the signal, route the signal, retransmit the signal, or a combination thereof.

The beam controller 915 may adjust a beam configuration for receiving the signal during the transmission time interval, retransmitting the signal during the transmission time interval, or both. In some examples, the beam controller 915 may receive a beam configuration indication from a base station, where the beam configuration is adjusted based on the beam configuration indication. In some examples, the beam controller 915 may receive the beam configuration indication via a millimeter wave (mmW) downlink channel, a control command, or a combination thereof. In some examples, the beam controller 915 may select one or more receive beams and one or more transmit beams based on a degree of interference at the one or more receive beams caused by a transmission on the one or more transmit beams. In some cases, the beam configuration includes a beam width, a beam direction, a beam angle, or a combination thereof.

The baseband processing component 920 may cancel interference caused by either the receiving or the transmitting using a digital baseband processing component of the UE. The digital cancellation circuit 925 may isolate the receiving and the retransmitting using a digital cancellation circuit.

Figure 10:
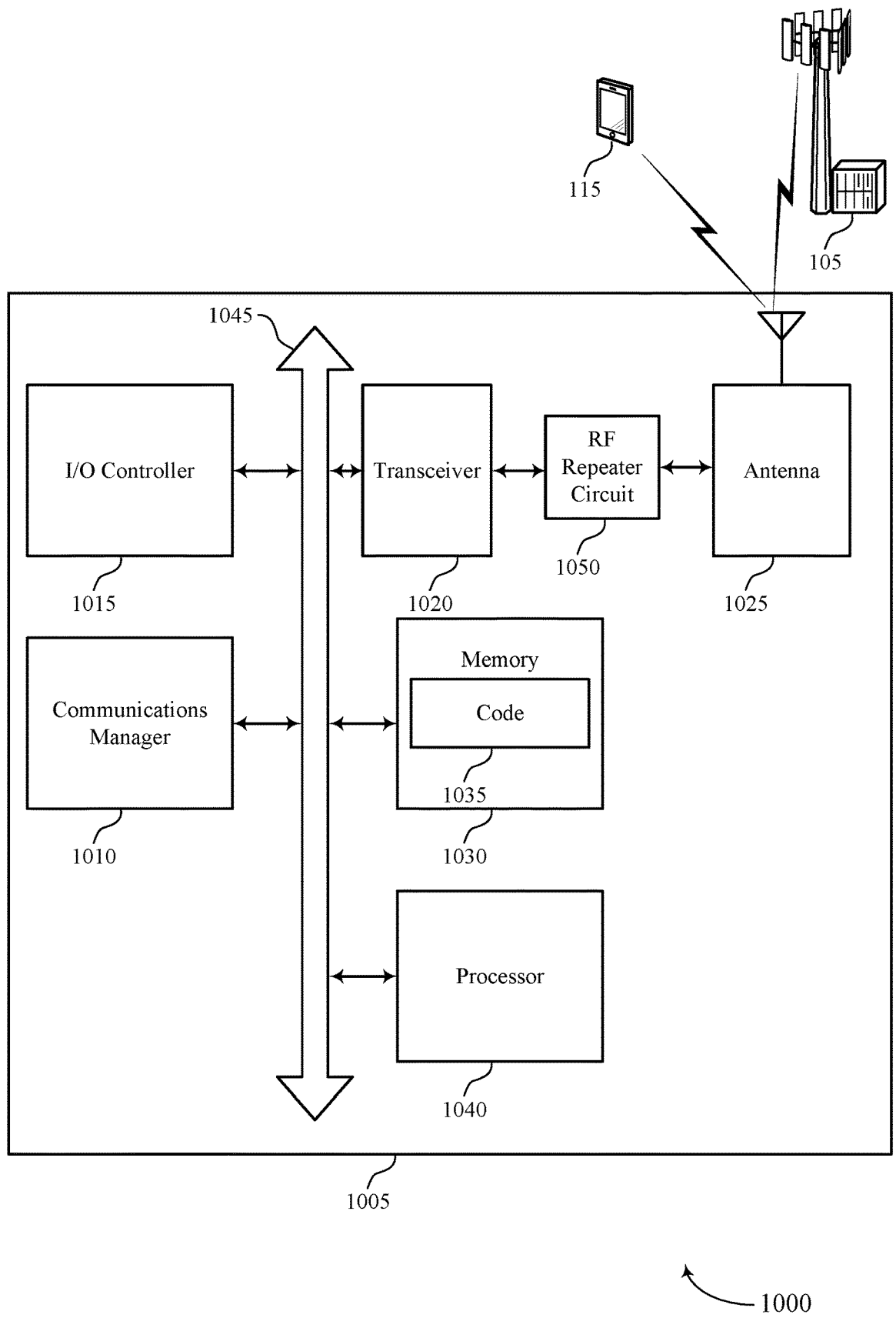
FIG. 10 shows a diagram of a system including a device that supports a UE with an integrated repeater function in accordance with one or more aspects of the present disclosure.

FIG. 10 shows a diagram of a system 1000 including a device 1005 that supports a UE with an integrated repeater function in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, an RF repeater circuit 1050, and a processor 1040. These components may be in electronic communication via one or more buses (e.g., bus 1045).

The RF repeater circuit 1050, which may be considered a component of the UE communications manager 1010, may receive, at the UE and during a transmission time interval reserved for one of uplink communication or downlink communication, a signal from a first device, where the UE is operating in a time division duplex network, route the signal via an RF transmission path from an RF receive chain of the UE to an RF transmit chain of the UE, and retransmit the signal to a second device during the transmission time interval.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a digital signal processor (DSP), a CPU, a microcontroller, an application specific integrated circuit (ASIC), a field-programmable gate array (FPGA), a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UE with an integrated repeater function).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
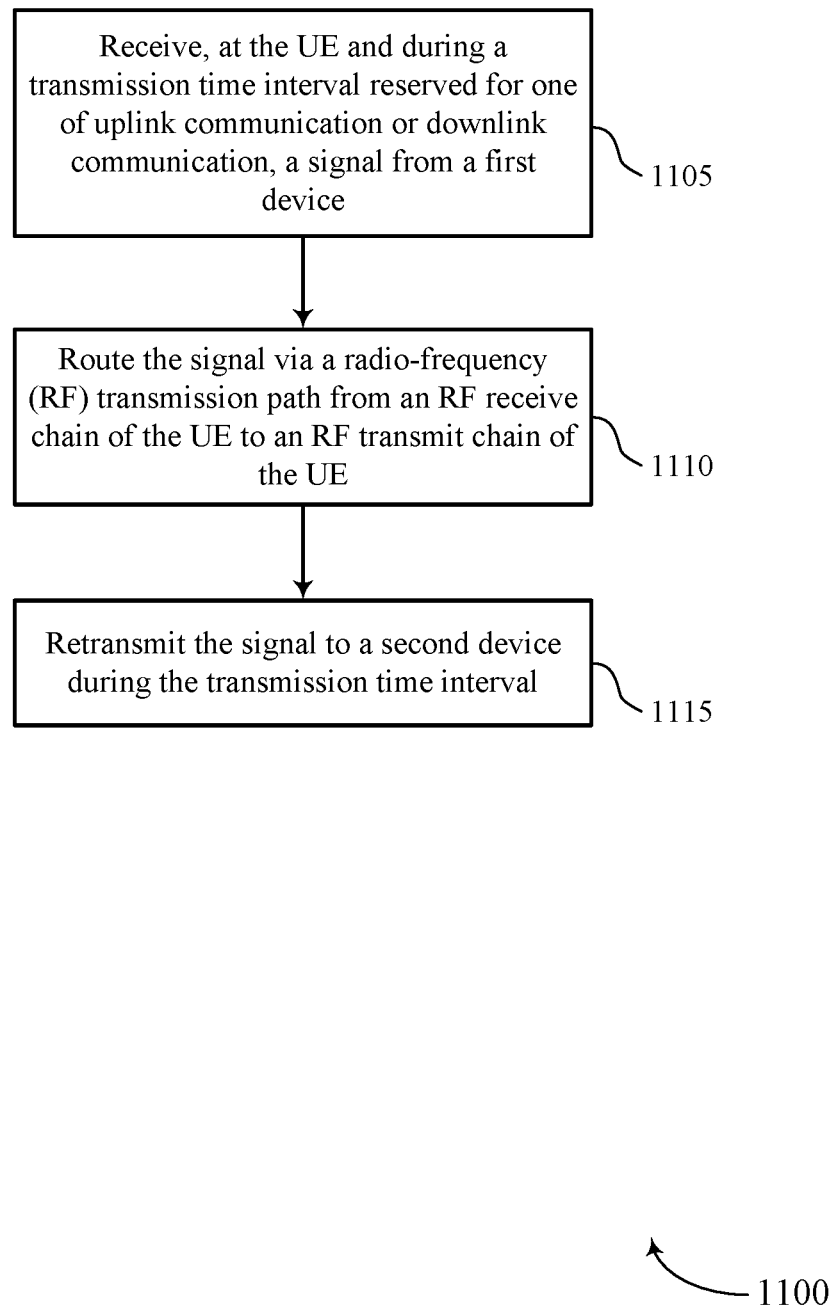
FIGS. 11 through 14 show flowcharts illustrating methods that support UE with an integrated repeater function in accordance with one or more aspects of the present disclosure.

FIG. 11 shows a flowchart illustrating a method 1100 that supports a UE with an integrated repeater function in accordance with one or more aspects of the present disclosure. The operations of method 1100 may be implemented by a UE 115 or its components as described herein. For example, the operations of method 1100 may be performed by a UE Coding Manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1105, the UE may receive, at the UE and during a transmission time interval reserved for one of uplink communication or downlink communication, a signal from a first device, where the UE is operating in a time division duplex network. The operations of 1105 may be performed according to the methods described herein. In some examples, aspects of the operations of 1105 may be performed by an RF repeater circuit as described with reference to FIGS. 7 through 10.

At 1110, the UE may route the signal via an RF transmission path from an RF receive chain of the UE to an RF transmit chain of the UE. The operations of 1110 may be performed according to the methods described herein. In some examples, aspects of the operations of 1110 may be performed by an RF repeater circuit as described with reference to FIGS. 7 through 10.

At 1115, the UE may retransmit the signal to a second device during the transmission time interval. The operations of 1115 may be performed according to the methods described herein. In some examples, aspects of the operations of 1115 may be performed by an RF repeater circuit as described with reference to FIGS. 7 through 10.

Figure 12:
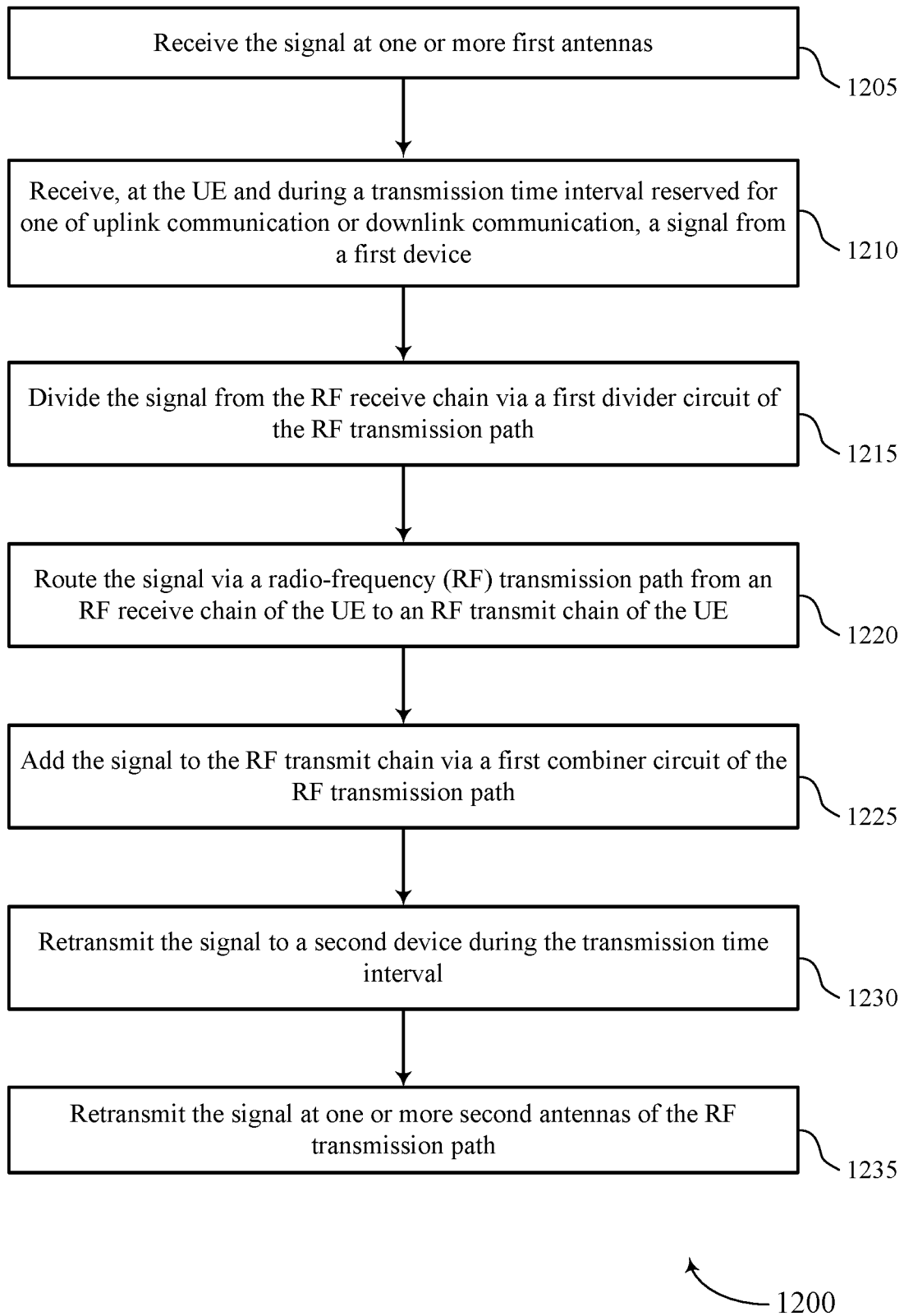

FIG. 12 shows a flowchart illustrating a method 1200 that supports a UE with an integrated repeater function in accordance with one or more aspects of the present disclosure. The operations of method 1200 may be implemented by a UE 115 or its components as described herein. For example, the operations of method 1200 may be performed by a UE Coding Manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1205, the UE may receive the signal at one or more first antennas, where the RF receive chain includes one or more LNAs and one or more phase shifters corresponding to the one or more first antennas and located between the one or more first antennas and the first divider circuit of the RF transmission path. The operations of 1205 may be performed according to the methods described herein. In some examples, aspects of the operations of 1205 may be performed by an RF repeater circuit as described with reference to FIGS. 7 through 10.

At 1210, the UE may receive, at the UE and during a transmission time interval reserved for one of uplink communication or downlink communication, a signal from a first device, where the UE is operating in a time division duplex network. The operations of 1210 may be performed according to the methods described herein. In some examples, aspects of the operations of 1210 may be performed by an RF repeater circuit as described with reference to FIGS. 7 through 10.

At 1215, the UE may divide the signal from the RF receive chain via a first divider circuit of the RF transmission path. The operations of 1215 may be performed according to the methods described herein. In some examples, aspects of the operations of 1215 may be performed by an RF repeater circuit as described with reference to FIGS. 7 through 10.

At 1220, the UE may route the signal via an RF transmission path from an RF receive chain of the UE to an RF transmit chain of the UE. The operations of 1220 may be performed according to the methods described herein. In some examples, aspects of the operations of 1220 may be performed by an RF repeater circuit as described with reference to FIGS. 7 through 10.

At 1225, the UE may add the signal to the RF transmit chain via a first combiner circuit of the RF transmission path. The operations of 1225 may be performed according to the methods described herein. In some examples, aspects of the operations of 1225 may be performed by an RF repeater circuit as described with reference to FIGS. 7 through 10.

At 1230, the UE may retransmit the signal to a second device during the transmission time interval. The operations of 1230 may be performed according to the methods described herein. In some examples, aspects of the operations of 1230 may be performed by an RF repeater circuit as described with reference to FIGS. 7 through 10.

At 1235, the UE may retransmit the signal at one or more second antennas, where the RF transmit chain includes one or more phase shifters, one or more PA drivers, and one or more PAs corresponding to the one or more second antennas and located between the one or more second antennas and the first combiner circuit of the RF transmission path. The operations of 1235 may be performed according to the methods described herein. In some examples, aspects of the operations of 1235 may be performed by an RF repeater circuit as described with reference to FIGS. 7 through 10.

Figure 13:
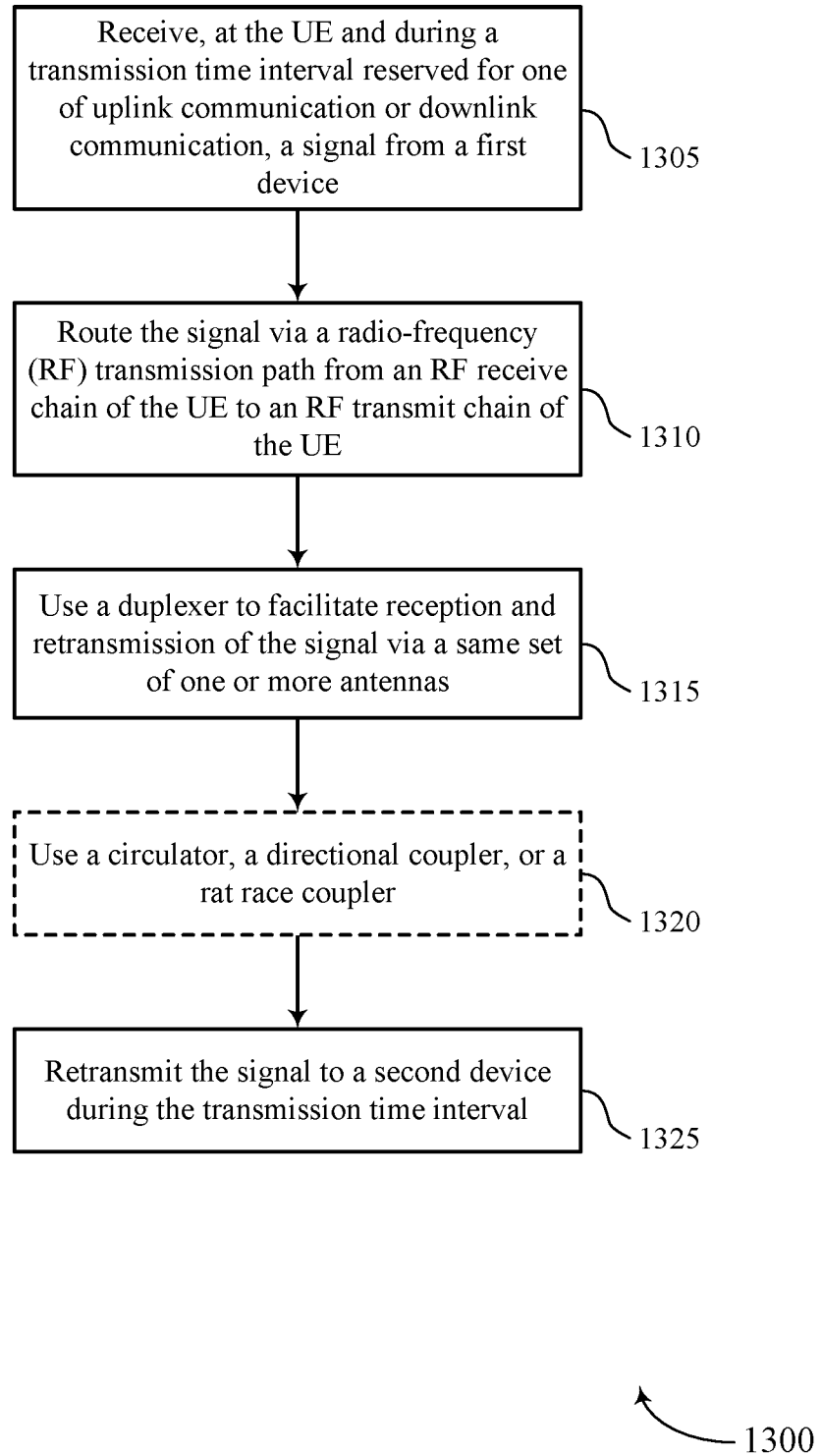

FIG. 13 shows a flowchart illustrating a method 1300 that supports a UE with an integrated repeater function in accordance with one or more aspects of the present disclosure. The operations of method 1300 may be implemented by a UE 115 or its components as described herein. For example, the operations of method 1300 may be performed by a UE Coding Manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1305, the UE may receive, at the UE and during a transmission time interval reserved for one of uplink communication or downlink communication, a signal from a first device, where the UE is operating in a time division duplex network. The operations of 1305 may be performed according to the methods described herein. In some examples, aspects of the operations of 1305 may be performed by an RF repeater circuit as described with reference to FIGS. 7 through 10.

At 1310, the UE may route the signal via an RF transmission path from an RF receive chain of the UE to an RF transmit chain of the UE. The operations of 1310 may be performed according to the methods described herein. In some examples, aspects of the operations of 1310 may be performed by an RF repeater circuit as described with reference to FIGS. 7 through 10.

At 1315, the UE may use a duplexer to facilitate reception and retransmission of the signal via a same set of one or more antennas. The operations of 1315 may be performed according to the methods described herein. In some examples, aspects of the operations of 1315 may be performed by an RF repeater circuit as described with reference to FIGS. 7 through 10.

At 1320, the UE may use a circulator, a directional coupler, or a rat race coupler. The operations of 1320 may be performed according to the methods described herein. In some examples, aspects of the operations of 1320 may be performed by an RF repeater circuit as described with reference to FIGS. 7 through 10.

At 1325, the UE may retransmit the signal to a second device during the transmission time interval. The operations of 1325 may be performed according to the methods described herein. In some examples, aspects of the operations of 1325 may be performed by an RF repeater circuit as described with reference to FIGS. 7 through 10.

Figure 14:
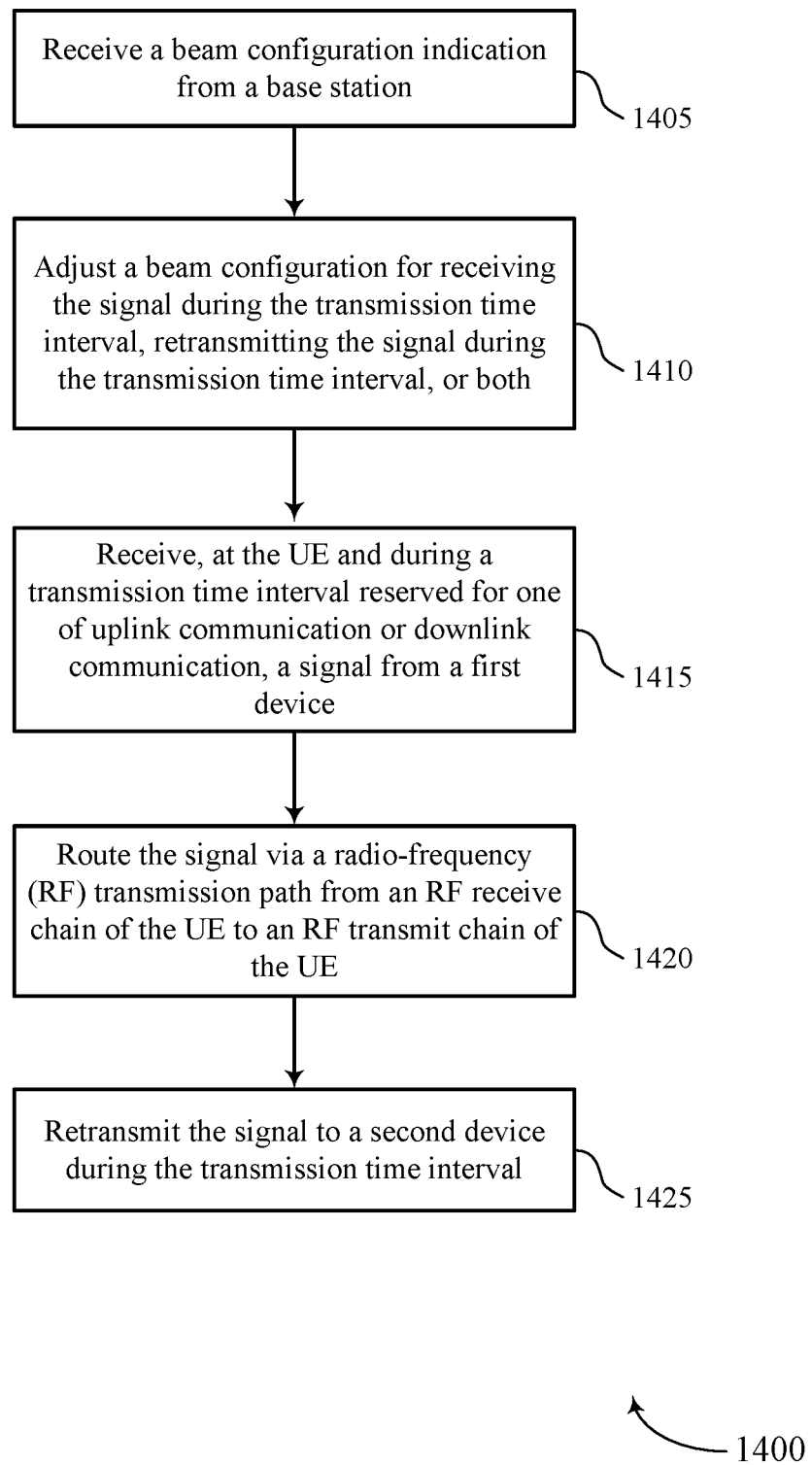

FIG. 14 shows a flowchart illustrating a method 1400 that supports a UE with an integrated repeater function in accordance with one or more aspects of the present disclosure. The operations of method 1400 may be implemented by a UE 115 or its components as described herein. For example, the operations of method 1400 may be performed by a UE Coding Manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1405, the UE may receive a beam configuration indication from a base station, where the beam configuration is adjusted based on the beam configuration indication. The operations of 1405 may be performed according to the methods described herein. In some examples, aspects of the operations of 1405 may be performed by a beam controller as described with reference to FIGS. 7 through 10.

At 1410, the UE may adjust a beam configuration for receiving the signal during the transmission time interval, retransmitting the signal during the transmission time interval, or both. The operations of 1410 may be performed according to the methods described herein. In some examples, aspects of the operations of 1410 may be performed by a beam controller as described with reference to FIGS. 7 through 10.

At 1415, the UE may receive, at the UE and during a transmission time interval reserved for one of uplink communication or downlink communication, a signal from a first device, where the UE is operating in a time division duplex network. The operations of 1415 may be performed according to the methods described herein. In some examples, aspects of the operations of 1415 may be performed by an RF repeater circuit as described with reference to FIGS. 7 through 10.

At 1420, the UE may route the signal via an RF transmission path from an RF receive chain of the UE to an RF transmit chain of the UE. The operations of 1420 may be performed according to the methods described herein. In some examples, aspects of the operations of 1420 may be performed by an RF repeater circuit as described with reference to FIGS. 7 through 10.

At 1425, the UE may retransmit the signal to a second device during the transmission time interval. The operations of 1425 may be performed according to the methods described herein. In some examples, aspects of the operations of 1425 may be performed by an RF repeater circuit as described with reference to FIGS. 7 through 10.

It should be noted that the methods described herein describe possible implementations, and that the operations may be rearranged or otherwise modified and that other implementations are possible. Further, aspects from two or more of the methods may be combined.

Example 1: A method for wireless communications at a UE, comprising: receiving, at the UE and during a transmission time interval reserved for one of uplink communication or downlink communication, a signal from a first device, wherein the UE is operating in a time division duplex network; routing the signal via a RF transmission path from an RF receive chain of the UE to an RF transmit chain of the UE; and retransmitting the signal to a second device during the transmission time interval.

Example 2: The method of example 1, wherein receiving the signal comprises: receiving the signal from the first device based at least in part on the RF receive chain and one or more reception antennas of the UE being active during the transmission time interval reserved for uplink communication.

Example 3: The method of example 1, wherein retransmitting the signal comprises: retransmitting the signal to the second device based at least in part on the RF transmit chain and one or more transmission antennas of the UE being active during the transmission time interval reserved for downlink communication.

Example 4: The method of any of examples 1 to 3, wherein routing the signal via the transmission path comprises: dividing the signal from the RF receive chain via a first divider circuit of the RF transmission path; and adding the signal to the RF transmit chain via a first combiner circuit of the RF transmission path.

Example 5: The method of any of examples 1 to 3, wherein receiving the signal from the first device comprises: receiving the signal at one or more first antennas and using the RF receive chain that includes one or more LNAs and one or more phase shifters corresponding to the one or more first antennas and located between the one or more first antennas and the first divider circuit of the RF transmission path.

Example 6: The method of any of examples 1 to 3 and 5, wherein retransmitting the signal to the second device comprises: retransmitting the signal at one or more second antennas using the RF transmit chain that includes one or more phase shifters, one or more PA drivers, and one or more PAs corresponding to the one or more second antennas and located between the one or more second antennas and the first combiner circuit of the RF transmission path.

Example 7: The method of any of examples 1 to 3, further comprising: using a duplexer to facilitate reception and retransmission of the signal via a same set of one or more antennas.

Example 8: The method of any of examples 1 to 3 and 7, wherein using the duplexer comprises: using a circulator, a directional coupler, a rat race coupler, or a combination thereof.

Example 9: The method of any of examples 1 to 3, 7 and 8, wherein the same set of one or more antennas functions in a first polarization to receive the signal and functions in a second polarization to retransmit the signal.

Example 10: The method of any of examples 1 to 3, further comprising: adjusting a beam configuration for receiving the signal during the transmission time interval, retransmitting the signal during the transmission time interval, or both.

Example 11: The method of any of examples 1 to 3 and 10 further comprising: receiving a beam configuration indication from a base station, wherein the beam configuration is adjusted based at least in part on the beam configuration indication.

Example 12: The method of any of examples 1 to 3, 10, and 11, wherein receiving the beam configuration indication comprises: receiving the beam configuration indication via a mmW downlink channel, a control command, or a combination thereof.

Example 13: The method of any of examples 1 to 3 and 10 to 12, wherein the beam configuration comprises a beam width, a beam direction, a beam angle, or a combination thereof.

Example 14: The method of any of examples 1 to 3 and 10 to 13, wherein adjusting the beam configuration comprises: selecting one or more receive beams and one or more transmit beams based at least in part on a degree of interference at the one or more receive beams caused by a transmission on the one or more transmit beams.

Example 15: The method of any of examples 1 to 14, further comprising: canceling interference caused by either the receiving or the transmitting using a digital baseband processing component of the UE.

Example 16: The method of any of examples 1 and 10 to 14, further comprising: using one or more meta-material antennas having a negative refractive index in order to either receive the signal, retransmit the signal, or both.

Example 17: The method of any of examples 1 to 16, further comprising: using a material having a tunable electric permittivity and permeability in order to receive the signal, route the signal, retransmit the signal, or a combination thereof.

Example 18: The method of any of examples 1 to 17, wherein retransmitting the signal to the second device comprises: broadcasting or unicasting the signal to one or more other UEs.

Example 19: The method of any of examples 1 and 3 to 18, wherein the first device is a base station, the second device is one or more UEs, and the transmission time interval is reserved for downlink communication.

Example 20: The method of any of examples 1, 2, and 4 to 18, wherein the first device is one or more UEs, the second device a base station, and the transmission time interval is reserved for uplink communication.

Example 21: The method of any of examples 1 to 20, further comprising: isolating the receiving and the retransmitting using a digital cancellation circuit.

Example 22: The method of any of examples 1 to 21, wherein the signal is a mmW transmission.

Example 23: An apparatus comprising at least one means for performing a method of any of examples 1 to 22.

Example 24: An apparatus comprising: a RF receive chain configured to receive, at the UE and during a transmission time interval reserved for one of uplink communication or downlink communication, a signal from a first device, wherein the UE is operating in a time division duplex network; an RF transmit chain configured to retransmit the signal to a second device during the transmission time interval; and an RF transmission path configured to route the signal from the RF receive chain to the RF transmit chain.

Example 25: The apparatus of example 24, wherein the RF receive chain is configured to remain active for reception of the signal during the transmission time interval reserved for uplink communication.

Example 26: The apparatus of example 24, wherein the RF transmit chain is configured to remain active for retransmission of the signal during the transmission time interval reserved for downlink communication.

Example 27: The apparatus of any of examples 24 to 26, wherein the RF transmission path further comprises: a first divider circuit configured to divide the signal from the RF receive chain; and a first combiner circuit configured to add the signal to the RF transmit chain.

Example 28: The apparatus of any examples 24 to 27, wherein the RF receive chain further comprises: one or more first antennas; and one or more LNAs and one or more phase shifters corresponding to the one or more first antennas and located between the one or more first antennas and the first divider circuit of the RF transmission path.

Example 29: The apparatus of any examples 24 to 28, wherein the RF transmit chain further comprises: one or more second antennas; and one or more phase shifters, one or more PA drivers and one or more PAs corresponding to the one or more second antennas and located between the one or more second antennas and the first combiner circuit of the RF transmission path.

Example 30: The apparatus of any of examples 24 to 27, further comprising: a duplexer configured to facilitate reception and retransmission of the signal via a same set of one or more antennas.

Example 31: The apparatus of any of examples 24 to 27 and 30, wherein the duplexer is a circulator, a directional coupler, a rat race coupler, or a combination thereof.

Example 32: The apparatus of any of examples 24 to 27, 30, and 31, wherein the same set of one or more antennas is configured to function in a first polarization to receive the signal and configured to function in a second polarization to retransmit the signal.

Example 33: The apparatus of any of examples 24 to 32, further comprising: a digital baseband processing component configured to cancel interference caused by either the receiving or the transmitting.

Example 34: The apparatus of any of examples 24 to 27, further comprising: one or more meta-material antennas having a negative refractive index in order to either receive the signal, retransmit the signal, or both.

Example 35: The apparatus of any of examples 24 to 34, wherein the RF receive chain, the RF transmit chain, the RF transmission path, or a combination thereof are formed of materials having a tunable electric permittivity and permeability.

Example 36: The apparatus of any of examples 24 and 26 to 35, wherein the first device is a base station, the second device is one or more UEs, and the transmission time interval is reserved for downlink communication.

Example 37: The apparatus of any of examples 24, 25, and 27 to 35, wherein the first device is one or more UEs, the second device is a base station, and the transmission time interval is reserved for uplink communication.

Example 38: The apparatus of any of examples 24 to 37, further comprising: a digital cancellation circuit for isolating the receiving and the retransmitting.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative components and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory, read-only memory, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, at the UE and during a transmission time interval reserved for one of uplink communication or downlink communication, a signal from a first device, the uplink communication or the downlink communication being separate from the signal, the signal to be repeated by the UE, and wherein the UE is operating according to a time division duplex mode;
   routing the signal via a radio-frequency (RF) transmission path from an RF receive chain of the UE to an RF transmit chain of the UE, wherein the RF transmission path is coupled between the RF receive chain and the RF transmit chain; and
   retransmitting the signal to a second device during the transmission time interval, wherein the first device is a different UE and the second device is a network entity when the transmission time interval is reserved for uplink communication, and wherein the first device is the network entity and the second device is the different UE when the transmission time interval is reserved for downlink communication.

2. The method of claim 1, wherein receiving the signal comprises:
   receiving the signal from the different UE based at least in part on the RF receive chain and one or more reception antennas of the UE being active during the transmission time interval reserved for uplink communication.

3. The method of claim 1, wherein retransmitting the signal comprises:
   retransmitting the signal to the network entity based at least in part on the RF transmit chain and one or more transmission antennas of the UE being active during the transmission time interval reserved for downlink communication.

4. The method of claim 1, wherein routing the signal via the RF transmission path comprises:
   dividing the signal from the RF receive chain via a first divider circuit of the RF transmission path; and
   adding the signal to the RF transmit chain via a first combiner circuit of the RF transmission path.

5. The method of claim 4, wherein receiving the signal from the first device comprises:
   receiving the signal at one or more first antennas and using the RF receive chain that includes one or more low-noise amplifiers (LNAs) and one or more phase shifters corresponding to the one or more first antennas and located between the one or more first antennas and the first divider circuit of the RF transmission path.

6. The method of claim 4, wherein retransmitting the signal to the second device comprises:
   retransmitting the signal at one or more second antennas and using the RF transmit chain that includes one or more phase shifters, one or more power amplifier (PA) drivers, and one or more PAs corresponding to the one or more second antennas and located between the one or more second antennas and the first combiner circuit of the RF transmission path.

7. The method of claim 1, further comprising:
   using a duplexer to facilitate reception and retransmission of the signal via a same set of one or more antennas.

8. The method of claim 7, wherein the same set of one or more antennas functions in a first polarization to receive the signal and functions in a second polarization to retransmit the signal.

9. The method of claim 1, further comprising:
   adjusting a beam configuration for receiving the signal during the transmission time interval, retransmitting the signal during the transmission time interval, or both.

10. The method of claim 9, further comprising:
    receiving a beam configuration indication from the network entity, wherein the beam configuration is adjusted based at least in part on the beam configuration indication.

11. The method of claim 9, wherein the beam configuration comprises a beam width, a beam direction, or a combination thereof.

12. The method of claim 1, further comprising:
    canceling interference caused by one of the receiving and the retransmitting using a digital baseband processing component of the UE.

13. The method of claim 1, wherein the RF receive chain, the RF transmission path, the RF transmit chain, or a combination thereof are formed of a meta-material having a tunable electric permittivity and permeability.

14. The method of claim 1, wherein retransmitting the signal to the second device comprises:
    broadcasting or unicasting the signal to one or more other UEs.

15. The method of claim 1, wherein the first device is the network entity, the second device is one or more UEs, and the transmission time interval is reserved for downlink communication.

16. The method of claim 1, wherein the first device is one or more UEs, the second device the network entity, and the transmission time interval is reserved for uplink communication.

17. The method of claim 1, further comprising:
    isolating the receiving of the signal and the retransmitting of the signal from interference associated with another signal using a digital cancellation circuit.

18. An apparatus for wireless communications at a user equipment (UE), comprising:
    one or more radio-frequency (RF) receive chains configured to cause the UE to receive, at the UE and during a transmission time interval reserved for one of uplink communication or downlink communication, a signal from a first device, the uplink communication or the downlink communication being separate from the signal, the signal to be repeated by the UE, and wherein the UE is configured to operate according to a time division duplex mode;
    one or more RF transmit chains configured to cause the UE to retransmit the signal to a second device during the transmission time interval, wherein the first device is a different UE and the second device is a network entity when the transmission time interval is reserved for uplink communication, and wherein the first device is the network entity and the second device is the different UE when the transmission time interval is reserved for downlink communication; and
    an RF transmission path configured to cause the UE to route the signal from the one or more RF receive chain to the one or more RF transmit chains, wherein the RF transmission path is coupled between the one or more RF receive chains and the one or more RF transmit chains.

19. The apparatus of claim 18, wherein the one or more RF receive chains are configured to remain active for reception of the signal during the transmission time interval reserved for uplink communication.

20. The apparatus of claim 18, wherein the one or more RF transmit chains are configured to remain active for retransmission of the signal during the transmission time interval reserved for downlink communication.

21. The apparatus of claim 18, wherein the RF transmission path further comprises:
a first divider circuit configured to divide the signal from the one or more RF receive chains; and
a first combiner circuit configured to add the signal to the one or more RF transmit chains.

22. The apparatus of claim 21, wherein the one or more RF receive chains further comprise:
one or more first antennas; and
one or more low-noise amplifiers (LNAs) and one or more phase shifters corresponding to the one or more first antennas and located between the one or more first antennas and the first divider circuit of the RF transmission path.

23. The apparatus of claim 21, wherein the one or more RF transmit chains further comprise:
one or more second antennas; and
one or more phase shifters, one or more power amplifier (PA) drivers, and one or more PAs corresponding to the one or more second antennas and located between the one or more second antennas and the first combiner circuit of the RF transmission path.

24. The apparatus of claim 18, further comprising:
a duplexer configured to facilitate reception and retransmission of the signal via a same set of one or more antennas.

25. The apparatus of claim 24, wherein the same set of one or more antennas is configured to function in a first polarization to receive the signal and configured to function in a second polarization to retransmit the signal.

26. The apparatus of claim 18, further comprising:
a digital baseband processing component configured to cancel interference caused by one of receipt of the signal and retransmission of the signal.

27. The apparatus of claim 18, wherein the one or more RF receive chains, the one or more RF transmit chains, the RF transmission path, or a combination thereof are formed of meta-materials having a tunable electric permittivity and permeability.

28. The apparatus of claim 18, wherein the first device is the network entity, the second device is one or more UEs, and the transmission time interval is reserved for downlink communication.

29. The apparatus of claim 18, wherein the first device is one or more UEs, the second device is the network entity, and the transmission time interval is reserved for uplink communication.

30. An apparatus for wireless communications at a user equipment (UE), comprising:
means for receiving, at the UE and during a transmission time interval reserved for one of uplink communication or downlink communication, a signal from a first device, the uplink communication or the downlink communication being separate from the signal, the signal to be repeated by the UE, and wherein the UE is operating according to a time division duplex mode;
means for routing the signal via a radio-frequency (RF) transmission path from an RF receive chain of the UE to an RF transmit chain of the UE, wherein the RF transmission path is coupled between the RF receive chain and the RF transmit chain; and
means for retransmitting the signal to a second device during the transmission time interval, wherein the first device is a different UE and the second device is a network entity when the transmission time interval is reserved for uplink communication, and wherein the first device is the network entity and the second device is the different UE when the transmission time interval is reserved for downlink communication.

31. The apparatus of claim 30, further comprising:
means for receiving the signal from the different UE based at least in part on the RF receive chain and one or more reception antennas of the UE being active during the transmission time interval reserved for uplink communication.

32. The apparatus of claim 30, further comprising:
means for retransmitting the signal to the network entity based at least in part on the RF transmit chain and one or more transmission antennas of the UE being active during the transmission time interval reserved for downlink communication.

* * * * *